(12) United States Patent
Asai et al.

(10) Patent No.: US 12,274,947 B2
(45) Date of Patent: Apr. 15, 2025

(54) INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Wataru Asai, Kyoto (JP); Hirotake Otsubo, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 353 days.

(21) Appl. No.: 17/939,346

(22) Filed: Sep. 7, 2022

(65) Prior Publication Data

US 2023/0173396 A1 Jun. 8, 2023

(30) Foreign Application Priority Data

Dec. 8, 2021 (JP) ................................ 2021-199469

(51) Int. Cl.
*A63F 13/812* (2014.01)
*A63F 13/56* (2014.01)

(52) U.S. Cl.
CPC ............ *A63F 13/812* (2014.09); *A63F 13/56* (2014.09)

(58) Field of Classification Search
CPC ...... A63F 13/812; A63F 13/56; A63F 13/573; A63F 13/211
See application file for complete search history.

(56) References Cited

U.S. PATENT DOCUMENTS

| 7,278,913 B2* | 10/2007 | Ohyagi | ................... A63F 13/45 463/6 |
| 2002/0065119 A1 | 5/2002 | Togami | |
| 2005/0255900 A1* | 11/2005 | Takahashi | ............. A63F 13/573 463/3 |

(Continued)

FOREIGN PATENT DOCUMENTS

| JP | H10-305171 | 11/1998 |
| JP | 2010-233752 | 10/2010 |

OTHER PUBLICATIONS

Pong, Oct. 4, 2013, Wikipedia, https://web.archive.org/web/20131004172720/http://en.wikipedia.org/wiki/Pong (Year: 2013).*

(Continued)

*Primary Examiner* — Kevin Y Kim
(74) *Attorney, Agent, or Firm* — Nixon & Vanderhye, PC

(57) ABSTRACT

A user character and an ally character are arranged in a first area of a virtual space while an opponent character is arranged in a second area of the virtual space. The user character is assigned one of a plurality of roles in a predetermined order, according to a game progress. The plurality of roles include at least a role that moves a moving object in the first area and a role that moves the moving object toward the second area. The user character is automatically moved based on a predetermined role and on a moving direction of the moving object. In a case where the predetermined role is assigned to the user character and operation data satisfies a condition corresponding to the predetermined role, the moving object is moved by an action of the user character.

20 Claims, 24 Drawing Sheets

(56) References Cited

U.S. PATENT DOCUMENTS

2011/0077065 A1* 3/2011 Sandoval ............... A63F 13/54
                                                         463/31
2013/0196757 A1* 8/2013 Latta ..................... A63F 13/65
                                                         463/31

OTHER PUBLICATIONS

Wii Sports Club: Tennis available for the Wii U, printed May 26, 2022, one (1) page—*Please see concise statement of relevance above.*
Dec. 12, 2023 Office Action issued in Japanese Patent Application No. 2021-199469, pp. 1-6 [machine translation included].

* cited by examiner

F I G. 2

| | | (OPPONENT'S BALL) | FIRST TOUCH | SECOND TOUCH | THIRD TOUCH | (OPPONENT'S BALL) | FIRST TOUCH | SECOND TOUCH | THIRD TOUCH |
|---|---|---|---|---|---|---|---|---|---|
| 1P | SERVER | | RECEIVER | | SPIKER | BLOCKER | | SETTER | |
| 2P | | BLOCKER | | SETTER | | | RECEIVER | | SPIKER |

FIG. 3

|  |  | (OPPONENT'S BALL) | FIRST TOUCH | SECOND TOUCH | THIRD TOUCH | (OPPONENT'S BALL) | FIRST TOUCH | SECOND TOUCH | THIRD TOUCH |
|---|---|---|---|---|---|---|---|---|---|
| 1P | SERVER | BLOCKER |  | SETTER |  | BLOCKER |  | SETTER |  |
| 2P |  |  | RECEIVER |  | SPIKER |  | RECEIVER |  | SPIKER |

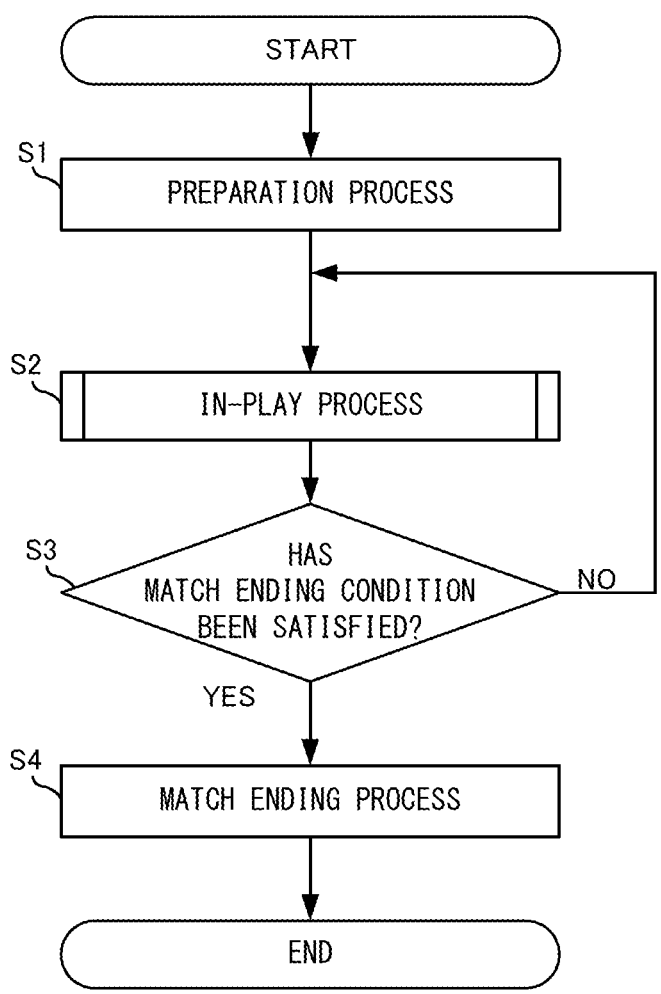
F I G. 1 6

INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

This application claims priority to Japanese Patent Application No. 2021-199469 filed on Dec. 8, 2021, the entire contents of which are incorporated herein by reference.

FIELD

The present disclosure relates to information processing for execution of a game related to a sport.

BACKGROUND AND SUMMARY

Conventionally, a ball game in which a front-row player and a back-row player progress a game, has been known.

In the ball game (specifically, a tennis game) as described above, once a game (a rally of a ball) has started, the front-row player and the back-row player are not interchanged until a point is scored. For example, when the game has started with a serve, the front-row player and the back-row player are not interchanged in the game (in a period until the rally is interrupted). Therefore, during this game, the user performs a play according to his/her role, i.e., the front-row player or the back-row player.

In this regard, there is room for improvement of the entertainment characteristics of the game by diversifying the role of the user during a game (a rally).

Therefore, an object of the present disclosure is to provide an information processing system, a non-transitory computer-readable storage medium having stored therein an information processing program, an information processing apparatus, and an information processing method capable of realizing a novel ball game in which roles in a game are successively assigned to characters, according to game progress.

In order to attain the above object, for example, the following configuration examples are exemplified.

A configuration example is an information processing system including an operation device, and an information processing apparatus including a processor. The operation device includes at least an inertial sensor, and a data transmission section configured to transmit operation data based on an output of the inertial sensor to the information processing apparatus. The processor performs at least the following processes. The processor performs a game regarding a sport using a moving object in a virtual space and character objects that include a user character to be operated by a user, an ally character, and an opponent character. The processor arranges the user character and the ally character in a first area of the virtual space, and arranges the opponent character in a second area of the virtual space. The processor assigns, to the user character, one of a plurality of roles in a predetermined order, according to a progress of the game. The plurality of roles includes at least a role that moves the moving object in the first area and a role that moves the moving object toward the second area. The processor automatically moves the user character to which a predetermined role is assigned, in the first area, on the basis of the predetermined role and a moving direction of the moving object. In a case where the predetermined role is assigned to the user character and the operation data acquired from the data transmission section satisfies a condition corresponding to the predetermined role, the processor moves the moving object by an action of the user character based on the predetermined role and the operation data.

According to the above configuration example, in the game in which the moving object is moved, a control of successively assigning the roles to the user character and the ally character in the predetermined order, is performed. Therefore, the roles of the user character can be diversified, and the user can be caused to perform an operation according to each role. Thus, the user can play the game while taking a variety of roles, thereby improving the entertainment characteristics of the game.

As another configuration example, the operation device may further include a direction input section. The operation data may further includes an output of the direction input section. When the predetermined role is assigned to the user character, the processor may move the user character on the basis of the output of the direction input section and the predetermined role.

According to the above configuration example, the user character can be moved not only automatically but also manually on the basis of a direction inputting operation directly performed by the user. Therefore, the user can perform positioning of the user character, or the like, in the first area, thereby improving the entertainment characteristics of the game.

As another configuration example, movement based on the output of the direction input section may be made possible when the moving object is in the second area.

According to the above configuration example, when the moving object is in the second area, the user character can be moved based on a direction inputting operation. Therefore, for example, in a state where the user waits for the moving object entering into the first area, positioning can be performed based on an operation performed by the user. Meanwhile, in a state where the moving object is in the first area, movement of the user character is left to automatic control so that the user can concentrate on an operation according to the role that the user takes.

As another configuration example, the one role among the plurality of roles may be assigned to the user character, regardless of a positional relationship between the moving object and the user character.

According to the above configuration example, the role is assigned in the predetermined order regardless of the positional relationship between the character and the moving object. Therefore, the user is allowed to equally experience various roles, thereby improving the entertainment characteristics of the game.

As another configuration example, the predetermined order with respect to the user character may be determined when the opponent character, to which a role of moving the moving object toward the first area is assigned, has performed a predetermined action based on the role.

According to the above configuration example, the role to be assigned can be more appropriately determined according to the game progress.

As another configuration example, the processor may automatically move the user character on the basis of at least a position of the opponent character.

According to the above configuration example, for example, when the role of bumping the moving object being moved by the predetermined action of the opponent character is assigned to the user character, the user character can be automatically moved to an advantageous position for the role, according to the position of the opponent character. Thus, the user can concentrate on an operation of making the user character perform an action, whereby the assigned role can be easily performed.

As another configuration example, the processor may automatically move the user character on the basis of at least a position of the ally character.

According to the above configuration example, the user character can be automatically moved while also taking into account the position of the ally character. This allows the assigned role to be easily performed. Moreover, the user is provided with game playing experience as if he/she plays the game as a member of the team while cooperating with the ally character.

As another configuration example, in a case where a first role is assigned to the user character, when a positional relationship between the moving object that moves toward the first area and the user character satisfies a predetermined condition, the processor may change the moving direction of the moving object to a direction toward the second area.

According to the above configuration example, if the user timely performs the predetermined operation, the user can cause the user character to perform an action of bouncing the moving object, which has been moved toward the first area by an action of the opponent character, back into the second area. Thus, the entertainment characteristics of the game can be improved.

As another configuration example, in a case where a second role is assigned to the user character, when the operation data indicates that the operation device has been swung with a predetermined orientation at a first timing, the processor may move the moving object toward the second area on the basis of the operation data.

According to the above configuration example, if the user timely performs the operation of swinging the operation device when the second role is assigned to the user character, the user can cause the user character to perform an action of hitting the moving object into the second area.

As another configuration example, in a case where the second role is assigned to the user character, when the operation data indicates that the operation device has been swung with the predetermined orientation at a second timing earlier than the first timing, the processor may move the moving object toward the second area on the basis of the operation data.

According to the above configuration example, when the user causes the user character to perform the action of hitting the moving object into the second area, the user can be provided with a plurality of execution timings. Since it is left up to the user to select an execution timing, the strategic characteristics and the entertainment characteristics of the game can be improved.

As another configuration example, the information processing system may further include a second information processing apparatus. Furthermore, the opponent character or the ally character may be set to be controlled by a user of the second information processing apparatus. The processor may assign, to the user character, one of a plurality of roles in a predetermined order, according to a progress of the game, the plurality of roles including at least a role that moves the moving object in the first area and a role that moves the moving object toward the second area.

According to the above configuration example, the user is provided with game playing experience as if he/she plays the game as a member of the team.

As another configuration example, the processor may display a notification image indicating, for the user, the role assigned to the user character.

According to the above configuration example, in the game progress in which the roles are successively changed, the user is allowed to grasp the role that he/she should take next, and an operation that he/she should perform for the role. Thus, the user is prevented from becoming confused about what operation he/she should do next.

As another configuration example, when the role assigned to the user character has been changed, the processor may display the notification image.

According to the above configuration example, since the user is notified of the next role when role change has occurred, the user is allowed to readily grasp the role for which he/she should perform an operation.

As another configuration example, after the predetermined role has been assigned to the user character, the processor may display the notification image at a timing before a timing to perform an operation corresponding to the assigned role.

According to the above configuration example, the notification image can be displayed at a more appropriate timing such as a little before the timing to perform an operation corresponding to the role after the role change, for example.

As another configuration example, the processor may increase a moving speed of a character object belonging to a team that is losing in game progress, between an own team to which the user character and the ally character belong and an opponent team to which the opponent character belongs.

According to the above configuration example, since adjustment advantageous to the losing team is performed, one-sided game progress is avoided, thereby avoiding reduction in the entertainment characteristics of the game.

As another configuration example, the processor may increase a moving speed of the moving object, according to an increase in the number of movements of the moving object between the first area and the second area.

According to the above configuration example, since the moving speed of the moving object is increased according to the number of times the moving object is rallied between the first area and the second area, for example, the excitement for the game is increased, thereby improving the entertainment characteristics of the game.

As another configuration example, the processor may determine a moving speed of the moving object at a start of an in-play period, which is started when a predetermined starting condition is satisfied and is ended when a predetermined ending condition is satisfied, on the basis of a moving speed of the moving object at an end of a last in-play period.

According to the above configuration example, when the rally is interrupted and then restarted, the moving speed of the moving object before the interruption can be adopted to some extent. Thus, the user, who is used to the temporarily increased moving speed, is prevented from feeling discomfort due to the moving speed being returned to the initial speed. According to the present disclosure, the roles of the user character are diversified so that the user can take a variety of roles, thereby improving the entertainment characteristics of the game.

BRIEF DESCRIPTION OF THE DRAWINGS

FIG. 2 shows a non-limiting example of a role order pattern;

FIG. 3 shows another non-limiting example of a role order pattern;

FIG. 16 is a flowchart showing game processing of the exemplary embodiment in detail;

DETAILED DESCRIPTION OF NON-LIMITING EXAMPLE EMBODIMENTS

Hereinafter, an exemplary embodiment will be described.
[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
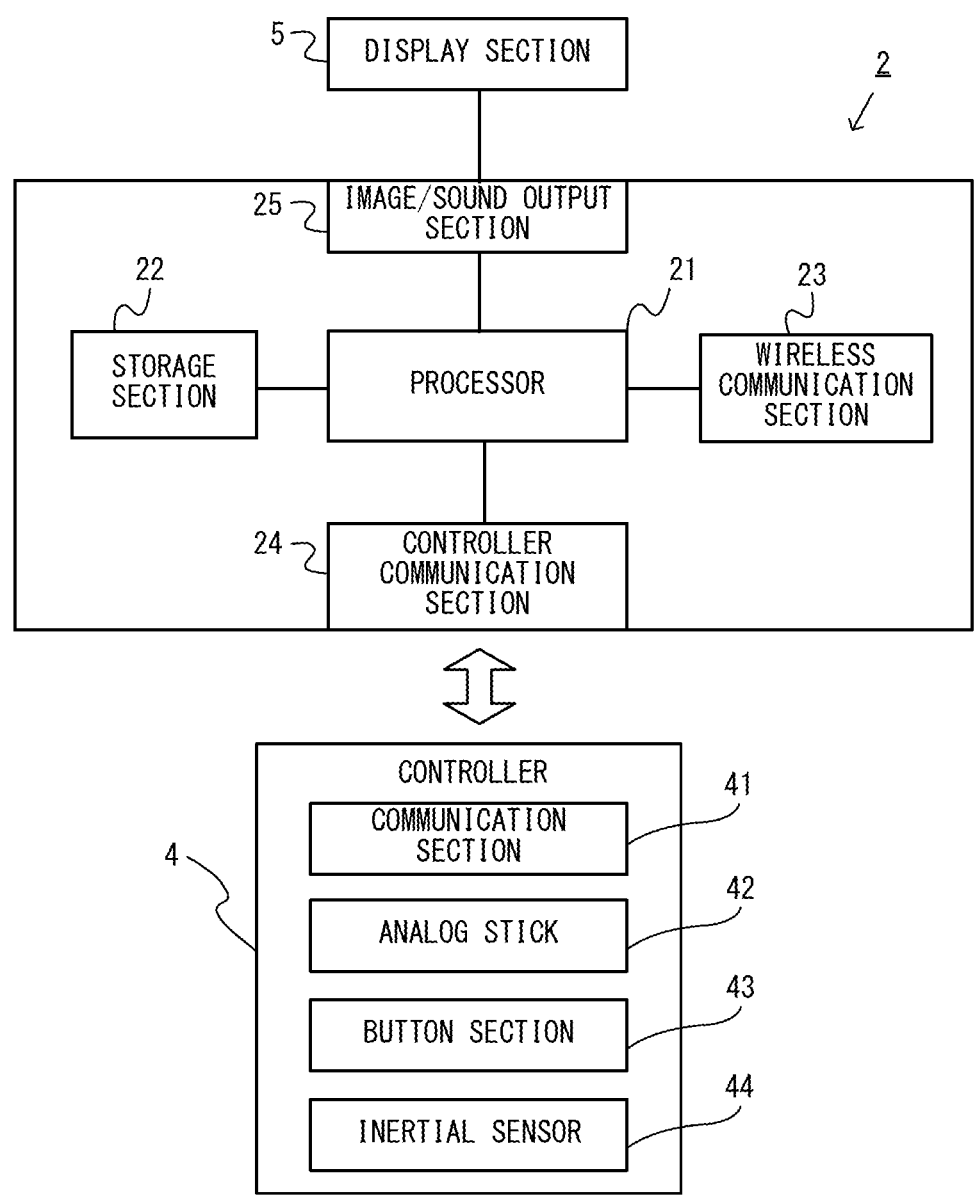
FIG. 1 is a block diagram showing a non-limiting example of an internal configuration of a game apparatus 2.

FIG. 1 is a block diagram showing a non-limiting example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 and a predetermined server device. As the wireless communication, for example, Internet communication or short-range wireless communication is used.

The game apparatus 2 also includes a controller communication section 24 for the game apparatus 2 to perform wired or wireless communication with a controller 4.

Moreover, a display section 5 (e.g., a television, or the like) is connected to the game apparatus 2 via an image/sound output section 25. The processor 21 outputs an image and sound generated (e.g., by executing the above information processing) to the display section 5 via the image/sound output section 25.

Next, the controller 4 will be described. Although not shown in the figure, the controller 4 of the exemplary embodiment includes a housing having a vertically long shape, and can be held in the orientation in which the controller 4 is vertically long. The housing has such a shape and a size that when held in the orientation in which the housing is vertically long, the housing can be held with one hand.

The controller 4 includes at least one analog stick 42 being an example of a direction input device. The analog stick 42 can be used as a direction input section capable of inputting a direction. By tilting the analog stick 42, the user can input a direction corresponding to the direction of the tilt (and an input having a magnitude corresponding to the angle of the tilt). The controller 4 includes a button section 43 including various operation buttons. For example, the controller 4 may include a plurality of operation buttons on the main surface of the housing.

The controller 4 includes an inertial sensor 44. Specifically, the controller 4 includes an acceleration sensor and an angular velocity sensor, as the inertial sensor 44. In the exemplary embodiment, the acceleration sensor detects the magnitudes of accelerations along predetermined three-axis directions. The angular velocity sensor detects angular velocities around the predetermined three axis.

The controller 4 also includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 at appropriate timings, to be transmitted to the game apparatus 2.

[Game Assumed in the Exemplary Embodiment]

Next, the outline of game processing (an example of information processing) executed by the game apparatus 2 according to the exemplary embodiment will be described. First, the game assumed in the exemplary embodiment is a game the concept of which is volleyball. Specifically, in this game, a plurality of athlete character objects (hereinafter, simply referred to as athlete characters) being virtual human-type objects are divided into opponent team characters and own team characters. In a volleyball court prepared in a virtual space, the athlete characters in each team are arranged in an area (own court or opponent court) associated with the team. Furthermore, each athlete character is caused to perform a predetermined action based on an operation of the user, whereby the athlete character is brought into contact with a ball object (hereinafter, simply referred to as a ball) that is an example of a moving object. As a result, the ball is moved. In this game, the ball is returned to the opponent court after three ball touches (a ball touch due to a block is excluded) in the own court while keeping the ball in the air, thereby continuing a rally. When the ball lands in the area of the opponent court, one point is given as a score. In the exemplary embodiment, a team that has earned five points first in one game match is a winner.

In this game, the number of athlete characters in each team is two. That is, this game is played with four athlete characters in a 2 vs 2 team format (in other words, volleyball played by two people in each team). This game can be played by a plurality of users through a network. In the exemplary embodiment, it is assumed that one user is in charge of one athlete character and operates the athlete character. Since this game is a 2 vs 2 online multiplayer game as described above, four users at maximum can participate the game. In the exemplary embodiment, one game apparatus is assigned to one user, so that four game apparatuses 2 in total are connected through the network.

[Game Progress]

This game is played such that the roles of two athlete characters in each team are successively changed. The roles are as follows. That is, the concept of this game is volleyball, and the roles correspond to roles (positions) in volleyball. Specifically, the roles include a "server", a "receiver", a "setter", a "spiker", and a "blocker". The aforementioned predetermined action is an action corresponding to each role. For example, an athlete character the role of which is the setter performs, as the predetermined action, an action of tossing the ball toward the spiker (a motion of tossing the ball with both hands raised above head). For example, an athlete character the role of which is the spiker performs, as the predetermined action, an action of spiking the ball tossed (by the setter), toward the opponent court (a motion of jumping and swinging an arm to hit the ball). For example, an athlete character the role of which is the blocker performs, as the predetermined action, an action of blocking a spike of the opponent team (a motion of jumping with both hands raised above head). This game is played while the roles of the two athlete characters in each team are changed among the aforementioned five roles in a predetermined order.

An example of the order of the roles is shown in FIG. 2. In addition, an example of the game progress is described with reference to FIG. 2. Here, it is assumed that, among the athlete characters in the own team, the first (1P side) athlete character is operated by the user while the second (2P side) athlete character is operated by another user. The own team has the right to serve, and the first athlete character takes the role of the server. When a match has started, first, the first athlete character hits a serve according to a predetermined operation performed by the user. The next role of the first athlete character is the receiver. Through the serve, the ball is delivered to the opponent court, and after three ball touches, the ball is returned to the own court. At this point in time, the role of the second athlete character is the blocker. That is, the second athlete character takes the role of blocking a spike of the opponent team (as described above, the block is not counted as a ball touch). The next role of the second athlete character is the setter.

Next, when the ball is returned to the own court (because the above block could not block the opponent's spike), the first athlete character as the receiver performs an action of touching the ball for the first time. That is, the first athlete character bumps the ball according to a predetermined operation performed by the user. The next role of the first athlete character is the spiker.

Subsequently, the second athlete character as the setter performs an action of touching the ball for the second time. That is, the second athlete character performs an action of tossing the ball (toward the spiker) according to a predetermined operation performed by the other user. The next role of the second athlete character is the receiver.

When the toss has been made, the first athlete character as the spiker performs an action of touching the ball for the third time. That is, the first athlete character performs an action of spiking the ball according to a predetermined operation performed by the user. After the spike, the next role of the first athlete character is the blocker. That is, the role of the blocker, which has been taken by the second athlete character, is now taken by the first athlete character.

Thereafter, the game is progressed while the aforementioned roles assigned to the first athlete character and the second athlete character are replaced with each other. That is, the role of the first athlete character is changed in the order of blocker→setter, and the role of the second athlete character is changed in the order of receiver→spiker.

[Major Terms Used in the Following Description]

Hereinafter, the game flow (outline of game processing) as described above will be described more specifically with reference to the drawings. In advance of describing the game flow, major terms used in the game flow will be described.

First, the team to which the user belongs is referred to as "own team", and the other team is referred to as "opponent team".

As for the names of the athlete characters in the own team, an athlete character operated by the user is referred to as a user character (hereinafter abbreviated as "UC"), and the other character (an athlete character operated by another user) is referred to as an ally character. The athlete characters in the opponent team are collectively referred to as opponent characters, or are individually referred to as an opponent character A and an opponent character B according to need.

Contact of the ball with the ground in a court (a condition for acquiring a point being satisfied) is referred to as "landing" in the exemplary embodiment.

A period from start of a serve to interruption of a rally due to landing of the ball or the like, is referred to as "in-play".

A period in which the own team should make ball touches (bump, toss, spike) is referred to as "own-side ball period". Specifically, when the opponent team has the right to serve, the own-side ball period is a period from start of an opponent's serve to a spike hit toward the opponent court. When the own team has the right to serve, the own-side ball period is a period from a bump of an opponent's spike to a spike hit toward the opponent court. Conversely, a period in which the opponent team should make ball touches is referred to as "opponent-side ball period".

As described above, the game is progressed while the aforementioned roles are changed in each team according to the predetermined order. The predetermined order is fixedly determined (more specifically, once a role to be taken first is determined, the order of following roles is fixedly determined). In the following description, this order is referred to as "role order". As for the role order, there are two patterns of role assigning orders, depending on which, of the two athlete characters in the own team, takes the role of the server first (when the own team has the right to serve), or the role of the receiver first (when the opponent team has the right to serve). In the following description, a case where the 1P side (in this example, the user, i.e., the UC) takes the role of the server or the receiver first is referred to as "order pattern A", and a case where the 2P side (in this example, the other user, i.e., the ally character) takes the role of the server or the receiver first is referred to as "order pattern B". Therefore, the example shown in FIG. 2 indicates the "order pattern A", and a pattern in which 1P and 2P are interchanged as shown in FIG. 3 is the "order pattern B".

The aforementioned predetermined actions according to the respective roles are collectively referred to as "role-related actions". For example, the role-related action of the server is "serve", the role-related action of the receiver is "bump", the role-related action of the setter is "toss", the role-related action of the spiker is "spike", and the role-related action of the blocker is "block".

[Right to Serve]

Here, supplementary description is given for the right to serve. In the exemplary embodiment, transfer of the right to serve conforms to the rules of actual volleyball. That is, when a team not having the right to serve wins a rally, this team acquires a point and the right to serve. Meanwhile, when a team having the right to serve wins a rally, the right to serve is not transferred and the same team performs a serve also in the next in-play. However, in another embodiment, the right to serve may be alternately transferred between the two teams for each in-play, regardless of which team wins a rally.

[Role Order Determination Timing]

Next, a timing to determine the role order according to the exemplary embodiment will be described. In the exemplary embodiment, the role order is determined for each in-play, regardless of whether or not transfer of the right to serve occurs when the in-play is interrupted and restarted. In another embodiment, the role order may not necessarily be determined for each in-play, and a control of re-determining the role order may be performed when transfer of the right to serve has occurred, for example.

When the own team has the right to serve, the role order of the own team in the in-play has already been determined before start of a serve. Meanwhile, when the opponent team has the right to serve, since, before start of a serve, where the ball comes is uncertain, which athlete character will bump the serve is also uncertain. Therefore, it is undetermined whether the role order in the own team is the "order pattern A" or the "order pattern B". In this case, the timing at which the pattern of the role order is determined is when an opponent's serve is performed. That is, an athlete character, which is closer to a destination (predicted landing point) of the ball that is moving due to the opponent's serve, is determined as the receiver. At the timing when the receiver has been determined, whether the role order is the "order pattern A" or the "order pattern B" is determined. That is, when the opponent team has the right to serve, the role order in the in-play at that time is determined at the timing when the opponent's serve has been performed.

[Order of Taking Role of Server in Own Team]

In the exemplary embodiment, as for the order of taking the role of the server in the own team, it is premised that the 1P side takes the role of the server first. Therefore, when the own team has the right to serve, the role order is repeatedly changed in the order of "order pattern A"→"order pattern B" as the athlete character taking the role of the server changes.

[Example of Screen]

Figure 4:
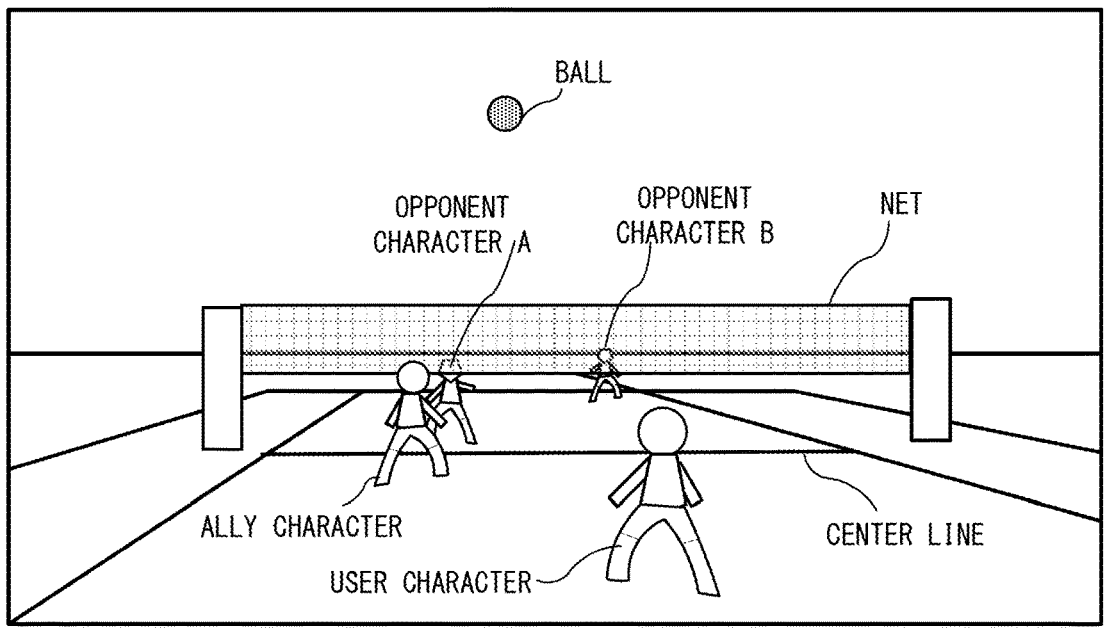
FIG. 4 shows a non-limiting example of a game screen according to an exemplary embodiment.
Figure 5:
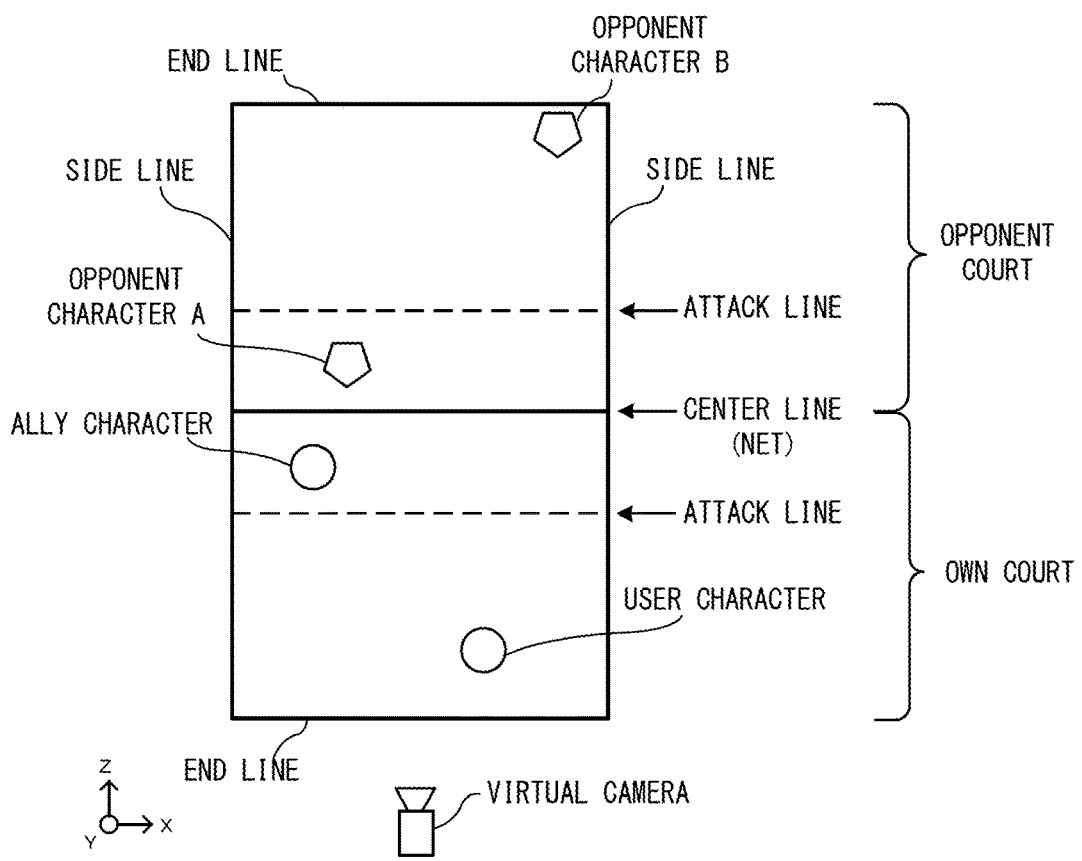
FIG. 5 is a schematic diagram in which a virtual game space shown in FIG. 4 is viewed from above.

Next, an example of a screen and examples of operation and action of each athlete character will be described with reference to the drawings. FIG. 4 shows a non-limiting example of a game screen of this game. FIG. 5 schematically shows the positional relationship between the athlete characters when a virtual space regarding the game screen is viewed from above. In the game screen shown in FIG. 4, a three-dimensional game image obtained by capturing a three-dimensional virtual space with a virtual camera, is displayed. In this game, basically, the virtual camera is located behind the UC, and the position and angle of the virtual camera are appropriately controlled such that the (back of) UC is always in the screen on a third person viewpoint (so as to follow the position of the UC). The position and angle of the virtual camera may be appropriately controlled according to the game progress and the match progress.

In the example shown in FIG. 4 and FIG. 5, a volleyball court is divided into two areas across a center line. An area on the near side as viewed from the virtual camera is an own court, and an area on the far side is an opponent court. In the example shown in FIG. 5, in the own court, the ally character is arranged at a position near the center line, and the UC is arranged at a position near the end line. In the opponent court, an opponent character A is arranged at a position near the center line, and an opponent character B is arranged at a position near the end line.

[Examples of Operation and Action of Athlete Character]

Next, a description is given for the outline of the game flow, and examples of operations and actions of the athlete characters according to the exemplary embodiment.

[Case where Own Team has Right to Serve]

First, an example of the game flow when the own team has the right to serve will be described. As described above, immediately after start of the match, the 1P side, i.e., the UC, is the server. Therefore, when a serve is started, it has already been determined that the role order in the current in-play is the "order pattern A". In addition, at this time, the UC as the server is at a predetermined position near the end line while the ally character as the blocker is at a predetermined position near the net.

[Server]

First, the server will be described. The server is a role of hitting a ball toward the opponent court. When a match has started, the user performs an operation of causing the UC to perform a serve. In this example, for example, the user performs an action of raising his/her right arm while holding the controller 4 (as if lofting the ball) and thereafter timely swinging down the controller 4 (as if hitting the ball), thereby performing a serve operation. The game apparatus 2 detects the swing-down action on the basis of the inertial sensor 44 to determine that the serve operation has been performed. In this game, as for the direction in which the ball is moved by the serve (direction in which the ball is hit), the ball can be hit to right and left according to the direction in which the arm is swung down. The serve operation performed by the user causes the UC to perform a predetermined motion simulating a serve of actual volleyball, i.e., a motion of lofting the ball and hitting the ball with its right arm (or left arm). Thus, the current in-play has started.

[Operation in Opponent-Side Ball Period]

After the serve, in the opponent team, actions corresponding to three touches, i.e., bump→toss→spike, are typically performed, and the ball is returned to the own court. Here, a description is given for an operation of the user (UC) in a period until the ball is returned from the opponent team, i.e., the aforementioned opponent-side ball period. In a part, defined in advance, of the opponent-side ball period, the user can move the UC in the left-right direction (an x-axis direction in FIG. 4, FIG. 5) by using the analog stick 42. Hereinafter, this period is referred to as a manual-movement-allowed period. Examples of the manual-movement-allowed period include: a period until a spike is performed after a bump is performed by the opponent character; and a period until a spike is performed after a toss is performed by the opponent character. An example of the manual movement is as follows. That is, after the serve, the UC takes the role of the receiver and the ally character takes the role of the blocker. Therefore, after the serve, the UC is generally positioned on the rear side of the court (near the end line), and the ally character is positioned near the net. Then, in the manual-movement-allowed period, the user moves the UC as the receiver in the left-right direction at the position near the end line, thereby controlling to some extent the spike direction of the opponent's spiker (e.g., leading the spike in a direction where the receiver is absent). If the UC takes the role of the blocker, the UC is moved in the left-right direction at the position near the net before the opponent hits a spike, thereby controlling to some extent the direction of the opponent's spike. Enabling the user to perform the manual operation as described above improves the strategic characteristics of the game, and further improves the entertainment characteristics of the game.

In the manual-movement-allowed period, in addition to the operation of moving the blocker in the left-right direction, an operation of causing the blocker to jump is also allowed. The operation for the blocker will be described later.

The other user who operates the ally character can also perform the same operation (for the blocker) as described above by using the game apparatus 2 that the other user operates. Then, the operation data is transmitted to the game apparatus 2 of the user, and the action of the ally character is controlled based on the operation data.

In the exemplary embodiment, the moving direction in the manual-movement-allowed period is only the left-right direction. In another embodiment, movement by the manual operation may be allowed in all directions including the front-rear direction (360 degree direction on the xz plane in FIG. 5).

[Operation in Own-Side Ball Period]

Next, a description is given for operations and actions during the own-side ball period, i.e., after a spike has been performed by the opponent team and thereby the ball is returned to the own court. First, in the own-side ball period, regarding the "movement" of the UC (and the ally character), an automatic movement control is performed (hereinafter referred to as "auto-movement"). That is, in the own-side ball period, a control of automatically moving each of the athlete characters in the own team toward a position suitable for its role is performed. Hereinafter, a position to be a target of the auto-movement is referred to as a "movement target point". The movement target point is calculated for each role, based on a predicted landing point of the ball in the own court. The movement target point is a position suitable for the athlete character taking the role to execute the role-related action. For example, for the receiver, the movement target point is a position where the receiver can bump the ball.

Here, supplementary description is given for calculation of the predicted landing point of the ball and the movement target point. In the exemplary embodiment, the predicted landing point of the ball is calculated/updated at a timing when a contact between the ball and the athlete character (i.e., serve, bump, toss, spike, or block) has occurred. The movement target point is determined based on the predicted landing point. A calculation timing for the movement target point is as follows. That is, first, in an in-play when the own team has the right to serve, the own team hits a serve. At a timing when the serve is bumped by the opponent's receiver, a predicted landing point is calculated on the assumption that the ball is returned to the own court through a toss and a spike performed by the opponent team. Specifically, when the bump by the opponent team has occurred, it is assumed that, in the opponent team, the bumped ball is tossed and then spiked at predetermined positions and at predetermined timings. Then, a trajectory of the ball and a landing point of the ball in the own court (due to the opponent's spike) in the assumption are predicted. The predicted position and timing (hereinafter, generally referred to as "ideal timing") are, for example, such that the movement of the ball from the bump to the landing (in the opponent court) due to the spike becomes ideal. Based on the predicted landing point, a movement target point of the own team's receiver (hereinafter, sometimes referred to as "receiver target point") is temporarily calculated. Furthermore, assuming that the own team's receiver bumps this ball at an ideal timing, an ideal landing point of the ball is also calculated, and a movement target point of the own team's setter (hereinafter, sometimes referred to as "setter target point") is also calculated based on the ideal landing point. Moreover, assuming that the own team's setter tosses the ball toward an ideal position at an ideal timing, a movement target point of the own team's spiker (normal spike point/quick point described later) is also calculated. That is, when a bump by the opponent team has occurred, the movement target points of the own team's receiver, setter, and spiker are temporarily calculated, on the assumption that the ball is returned to the own court under a predetermined condition (in this example, at the ideal timing). Thereafter, the predicted landing point and the movement target point are adjusted as appropriate, according to the contents of ball contacts due to a toss and a spike that have actually occurred on the opponent team side before the return of the ball. The reason is as follows. Due to a contact of the opponent character and the ball, the moving direction of the ball or the like may be changed. Examples of the content of the contact include: the angle of the contact (collision) between the ball and the athlete character; the speeds of the ball and the athlete character when the contact occurs, the posture of the (arm of) athlete character when the contact occurs, the moving direction of the athlete character, etc. Then, when the ball has been returned due to the opponent's spike, auto-movements based on the movement target points are performed on the UC and the ally character during the own-side ball period. Thereafter, when a spike performed by the own team has been bumped by the opponent team, calculation of a predicted landing point and a movement target point based on the assumption as described above is again performed at this timing. As described above, in the exemplary embodiment, the movement target point of each role on the own team side is temporarily calculated when a bump has occurred in the opponent team. Thereafter, each time a contact between the ball and an athlete character occurs, the movement target point is adjusted as appropriate. Likewise, the movement target points on the opponent team side are calculated by a similar method.

In another embodiment, the predicted landing point of the ball in the own court may be calculated not when a bump has occurred but when a toss, a spike, or a block has occurred in the opponent team, and the movement target point of the receiver or the like may be calculated based on the predicted landing point.

Meanwhile, in an in-play when the opponent team has the right to serve, a predicted landing point of a served ball is calculated when an opponent's serve has occurred, and a movement target point of an own team's receiver is also calculated based on the predicted landing point. Furthermore, movement target points of own team's setter and spiker are also calculated on the assumption that the served ball is bumped by the own team's receiver at an ideal timing.

[Result of Block]

A result of a block performed by the blocker is described. In the exemplary embodiment, the block performed by the blocker leads to either of the following two results. One of the results is called "one touch". That is, due to a contact between the blocker and the ball, a movement trajectory, of the ball (toward the own court side), determined based on an opponent's spike is changed. However, the state in which the ball is moving toward the own court side is not changed, and therefore, the own team's receiver has to bump this ball. Therefore, in this case, the predicted landing point of the ball is corrected according to the occurrence of the block, and the movement target point of the own team's receiver is adjusted as appropriate according to the predicted landing point.

The other result of the block is called "bounce back". That is, movement of the ball toward the own court side is completely blocked, and the ball is bounced back to the opponent court side. Therefore, in this case, the opponent's receiver has to bump the blocked ball. In this case, at a timing when the opponent's receiver has bumped the ball, movement target points regarding the own team are calculated on the assumption of subsequent toss and spike by the opponent team as described above.

Hereinafter, as for the roles other than the server, examples of operations and actions thereof during the own-side ball period will be described.

[Receiver]

First, the receiver is described. The receiver has a role of bumping the ball and passing the ball to the setter. In other words, the receiver has a role of moving the ball in the own court. When the ball has been returned from the opponent team, first, the receiver bumps the ball. The aforementioned auto-movement causes the receiver to move toward the receiver target point. The receiver target point is a position suitable for performing a bump, and is calculated based on the predicted landing point of the ball.

The timing to start the auto-movement toward the receiver target point is when the own-side ball period has started, i.e., when the opponent team has hit a spike (and the blocker could not completely block the spike). When the spike of the opponent team has occurred and the blocker could not block the spike, the receiver starts to move toward the receiver target point calculated in advance as described above. If the user (in charge of the receiver) roughly predicts a direction in which the spike will be hit and performs positioning during the opponent-side ball period, the receiver can be more smoothly moved to the receiver target point. When the receiver has reached the receiver target point, the receiver stands by while taking a "bump posture" (i.e., the receiver does not move and waits for the ball). Then, the user performs an operation of bumping the ball (hereinafter referred to as "bump operation") in accordance with the timing at which the ball comes, thereby causing the receiver to bump the ball. If the user does not perform the bump operation or the user misses the timing to perform the receive operation, the ball lands and the in-play is interrupted. At this time, the ball lands while whether or not a contact between the receiver and the ball has occurred is not determined (the same applies to the setter, the spiker, and the blocker).

Next, an example of the "bump operation" is described. In the exemplary embodiment, a user's action of swinging the controller 4 upward from below is the bump operation (this action is detected based on the inertial sensor 44). For example, the user, holding the controller 4 (in a predetermined orientation), takes a posture as if actually bumping the ball with his/her both arms, and performs a swing motion of swinging the controller 4 upward from below, thereby performing the bump operation. The moving direction of the bumped ball may be adjustable to some extent, based on the swing direction of the controller 4 and the orientation of the controller 4.

Regarding the bump operation, in another embodiment, "flying bump" may be allowed through a predetermined operation, in addition to the aforementioned operation. For example, if the auto-movement cannot make the receiver reach the receiver target point in time, the user performs an action of swinging the controller 4 in the left-right direction at a predetermined timing, whereby the receiver performs a motion of "flying bump" which enables the receiver to bump the ball.

The aforementioned bump operation being performed at an appropriate timing allows the receiver to bump the ball (based on the content of the bump, the setter target point is adjusted as appropriate). In this game, when the bump operation has missed the appropriate timing (i.e., when the user has swung late), the ball speed is significantly reduced although the ball is bumped, which may result in a reduction in the power of a subsequent spike.

The athlete character having bumped the ball takes the role of the spiker next. Therefore, after the bump, auto-movement of this athlete character toward the movement target point of the spiker is started.

[Setter]

Next, the setter is described. The setter has a role of tossing the bumped ball (toward the spiker). Like the receiver, the setter also moves the ball in the own court. The aforementioned setter target point is a position based on the predicted landing point of the bumped ball.

For example, if the UC as the blocker could not bounce back a spike of the opponent team, an own-side ball period starts. Therefore, the UC, which has finished its role as the blocker, starts auto-movement as the setter toward the setter target point calculated in advance as described above. Thereafter, depending on the content of an own bump, the setter target point is corrected as appropriate. In the exemplary embodiment, when the ball has been bumped, the moving speed of the ball is temporarily reduced a little, which will be described later. This creates a temporal margin until the setter reaches the setter target point. When the setter has reached the setter target point, the setter stands by while taking a "tossing posture". In another embodiment, the timing to start the auto-movement of the setter may be when the own bump has occurred.

Next, an example of an operation regarding the setter is described. In the exemplary embodiment, a user's action of swinging the controller 4 upward from below is an operation of tossing (hereinafter referred to as "toss operation"). This action is detected based on the inertial sensor 44. For example, the user, holding the controller 4, takes a posture as if tossing the ball with both his/her arms being raised overhead, and further pushes the controller 4 upward, thereby performing the toss operation. At this time, the tossing direction may be adjustable to some extent, based on the direction in which the controller 4 is swung and pushed upward, and the orientation of the controller 4 at this time.

The above toss operation being performed at an appropriate timing allows the user to cause the setter to toss the ball. In this game, when the toss operation has missed the appropriate timing (i.e., when the user has swung late), the ball speed is significantly reduced although the ball is tossed, which may result in a reduction in the power of a subsequent spike.

The athlete character having tossed the ball takes the role of the receiver next.

[Spiker]

Next, the spiker is described. The spiker has a role of spiking (moving) the ball into the opponent court. When the athlete character as the receiver has finished a bump, auto-movement of this athlete character as the spiker toward a movement target point (a position where the athlete character can spike the tossed ball) is started.

In this game, the spiker is able to hit a so-called "quick spike" in addition to a normal spike. The quick spike is hitting the tossed ball before the ball reaches the highest point. For example, the quick spike is hitting the ball that is raised to a height slightly exceeding the net. Therefore, the spiker's motion of hitting the ball may slightly differ between the quick spike and the normal spike (e.g., differ in the height of jumping or the like).

Figure 6:
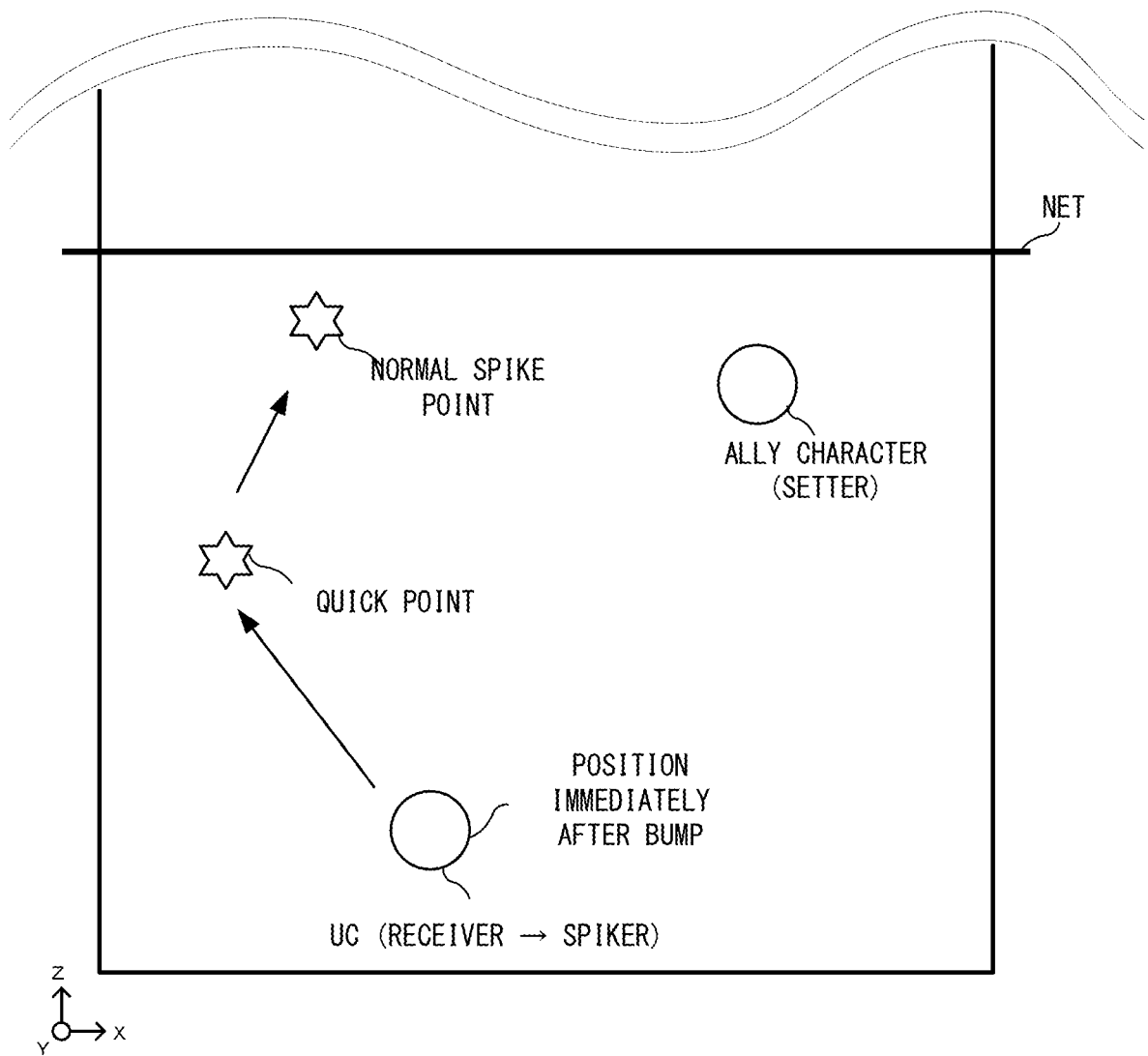
FIG. 6 illustrates a quick spike.

In the exemplary embodiment, when an own bump has been performed, not only the aforementioned movement target point for the spiker but also a position where the spiker can make a quick spike are calculated (as described above, this position may be calculated when an opponent's bump has occurred, and thereafter may be adjusted). Hereinafter, the former is referred to as a "normal spike point", and the latter is referred to as a "quick point". FIG. 6 shows an example of a positional relationship between the normal spike point and the quick point. In FIG. 6, the normal spike point is calculated to be a position closer to the net than the quick point. The tossed ball moves toward an area around the normal spike point. When the spiker starts to move from, as a start point, the position of the spiker immediately after the bump, the quick point is a position that the spiker can reach before the ball is tossed by the setter (before the ball comes into contact with the setter). In the exemplary embodiment, two types of spikes, i.e., the normal spike and the quick spike, can be appropriately used by performing an operation for hitting a spike (hereinafter referred to as "spike operation") at different timings. Specifically, the UC, which has finished its role as the receiver, starts auto-movement as the spiker toward the quick point. The spiker reaches the quick point, and temporarily stands by. Then, at the quick point, the spike operation is performed at a timing immediately before the setter tosses the ball (timing at which a quick spike is possible), whereby the spiker can be caused to hit a quick spike. FIG. 6 shows a motion in which the spiker hits the ball while dashing toward the net, for example. Meanwhile, when the above operation has not been performed at the timing at which a quick spike is possible, the spiker starts auto-movement toward the normal spike point. After reaching the normal spike point, the spiker stands by at the point. Then, the user performs the spike operation in accordance with the timing at which the ball comes, whereby the spiker is caused to hit a normal spike (e.g., the spiker jumps straight up and hits the ball). That is, if the user timely performs the spike operation when the spiker is present at the quick point, the user can cause the spiker to hit a quick spike. Meanwhile, if the user timely performs the spike operation when the spiker has reached the normal spike point, the user can cause the spiker to hit a normal spike.

Next, an example of the spike operation is described. In the exemplary embodiment, the spike operation is composed of two stages of operations, i.e., an operation for "jump" (hereinafter referred to as "spike jump operation") and an operation for "impact" (hereinafter referred to as "impact operation"). The spike jump operation is an operation of swinging the controller 4 upward from below, i.e., swinging up an arm (e.g., swinging the right arm backward). The impact operation is an operation of, after the spike jump operation, swinging the arm (controller 4) downward from the front. Performing the two stages of operations in series is the spike operation. By performing the series of operations at the normal spike point, the user can cause the spiker to hit a normal spike. By performing the series of operations at the quick point, the user can cause the spiker to hit a quick spike.

In this game, the power of the spike (the power of the ball) can be changed based on the timing of the spike operation (particularly, the impact operation), the ball speed at that time, and the like. In addition, in this game, a control may be performed such that the higher the power of the spike is, the less the ball is bounced back by an opponent's block.

After the athlete character as the spiker has hit a spike (or a quick spike), this athlete character takes the role of the blocker next. However, if the spike hit by this athlete character is blocked and bounced back into the own court, the athlete character takes the role of the setter because the role as the blocker has finished (although the spike temporarily causes the game to enter an opponent-side ball period, the opponent's block immediately causes the game to enter an own-side ball period).

[Blocker]

Next, the blocker is described. After hitting a spike, the spiker takes the role of the blocker to block a spike of the opponent team. That is, the role of the blocker is bouncing back an opponent's spike to move the ball toward the opponent court. Since an operation regarding the blocker is an operation in the opponent-side ball period (manual-movement-allowed period), auto-movement for the blocker is not performed. A basic operation for the blocker includes: moving the blocker in the left-right direction by using the analog stick 42 as described above; and causing the blocker to jump in accordance with (in prediction of) the timing of an opponent's spike. Hereinafter, such a jump of the blocker is referred to as "block jump".

As described above, there are two results of a block, i.e., "one touch" and "bounce back". In this game, one of the two results is selected depending on the timing of the block jump. Specifically, when a contact between the ball and the blocker has been detected in a period from when the block jump is started to when the position of the blocker reaches the highest point, this block is "one touch". A "hang time" during which the blocker is in the air for a short while after the blocker has reached the highest point as the result of the block jump, is provided. When a contact between the ball and the blocker has been detected in the hang time, this block is "bounce back".

As described above, when the user operates the athlete character as the blocker, the user performs the operation of causing the blocker to jump in accordance with the timing of the spike of the opponent team.

[Case where Opponent Team has Right to Serve]

The above game flow has been described for the case where the own team has the right to serve. Meanwhile, when the opponent team has the right to serve, the game is started from an opponent's serve. In this case, as described above, at the timing when the opponent's serve has been performed, an athlete character closer to a predicted landing point of this serve is determined as the receiver. Then, whether the role order in the current in-play is the "order pattern A" or the "order pattern B" is determined. Furthermore, movement target points of the own team such as a receiver target point are calculated at the timing when the opponent's serve (and a subsequent bump) has occurred. Therefore, when the opponent team has the right to serve, auto-movements for the receiver and the setter are started at the timing when the opponent's serve has occurred. Thereafter, the same operations and actions as described above are performed while the roles are successively changed based on the determined role order.

[Example of Movement of Own Team from Opponent's Serve to when Own Team Gains Point]

Hereinafter, a description is given for an example of movements of the athlete characters in the own team in a flow from an opponent's serve to when the own team gains a point, with reference to FIG. 7 to FIG. 14. Each of FIG. 7 to FIG. 14 is a schematic diagram showing the own court extracted and viewed from above.

Figure 7:
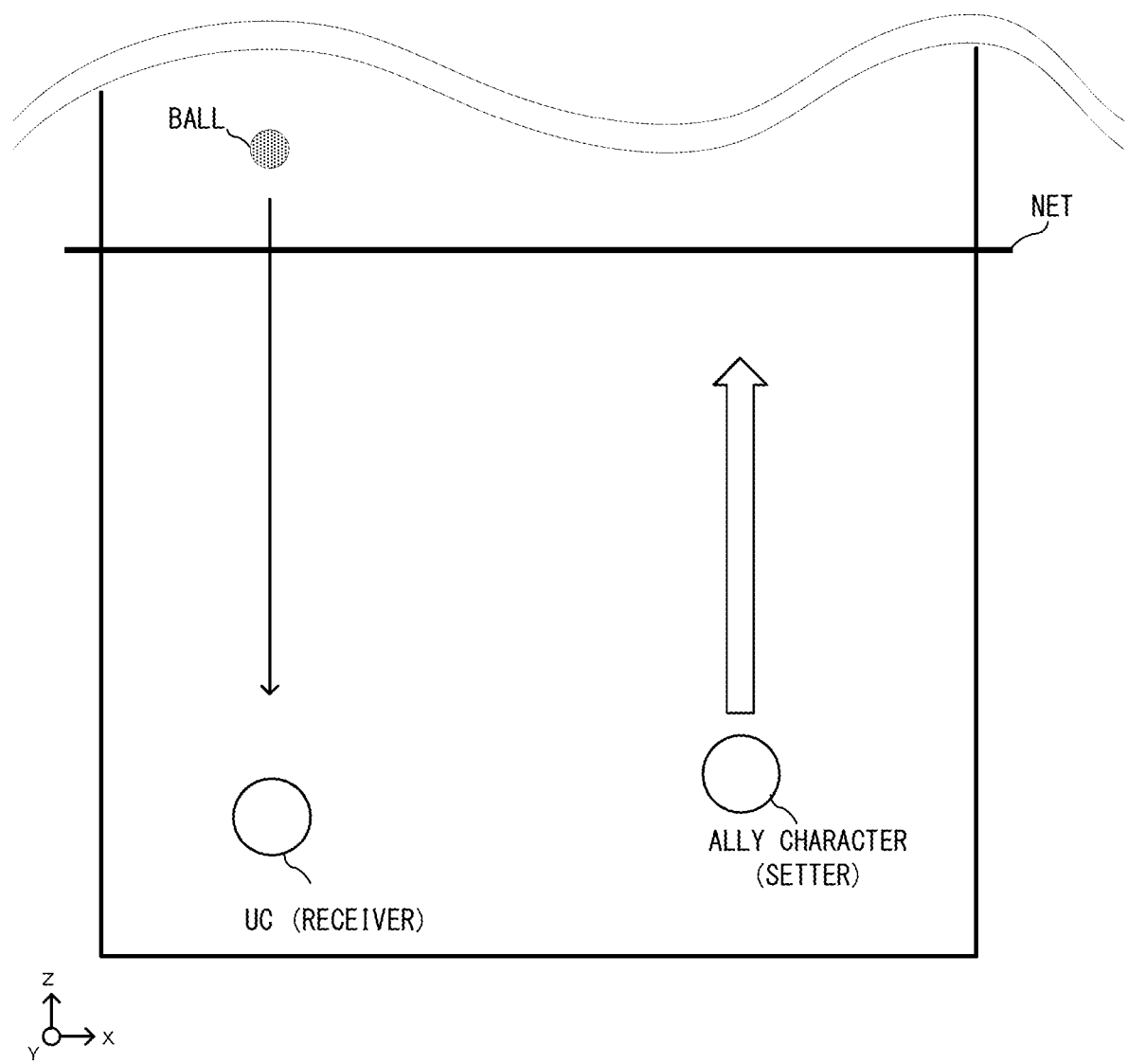
FIG. 7 is a schematic diagram showing a non-limiting example of movements of athlete characters.

First, FIG. 7 shows a state where an in-play has started and an opponent's serve has been performed. Immediately after start of the in-play, the UC and the ally character are positioned right and left, near the end line. A receiver is determined based on the direction of the opponent's serve. Here, the served ball moves toward the left rear of the own court, and the UC is determined as the receiver. Since the UC is the receiver, the ally character is the setter, and auto-movement of the setter (indicated by a thick arrow) toward the net is started as shown in FIG. 7. In the example shown in FIG. 7, the UC need not be moved. However, auto-movement of the UC toward a predicted landing point of the ball may be performed according to need.

Figure 8:
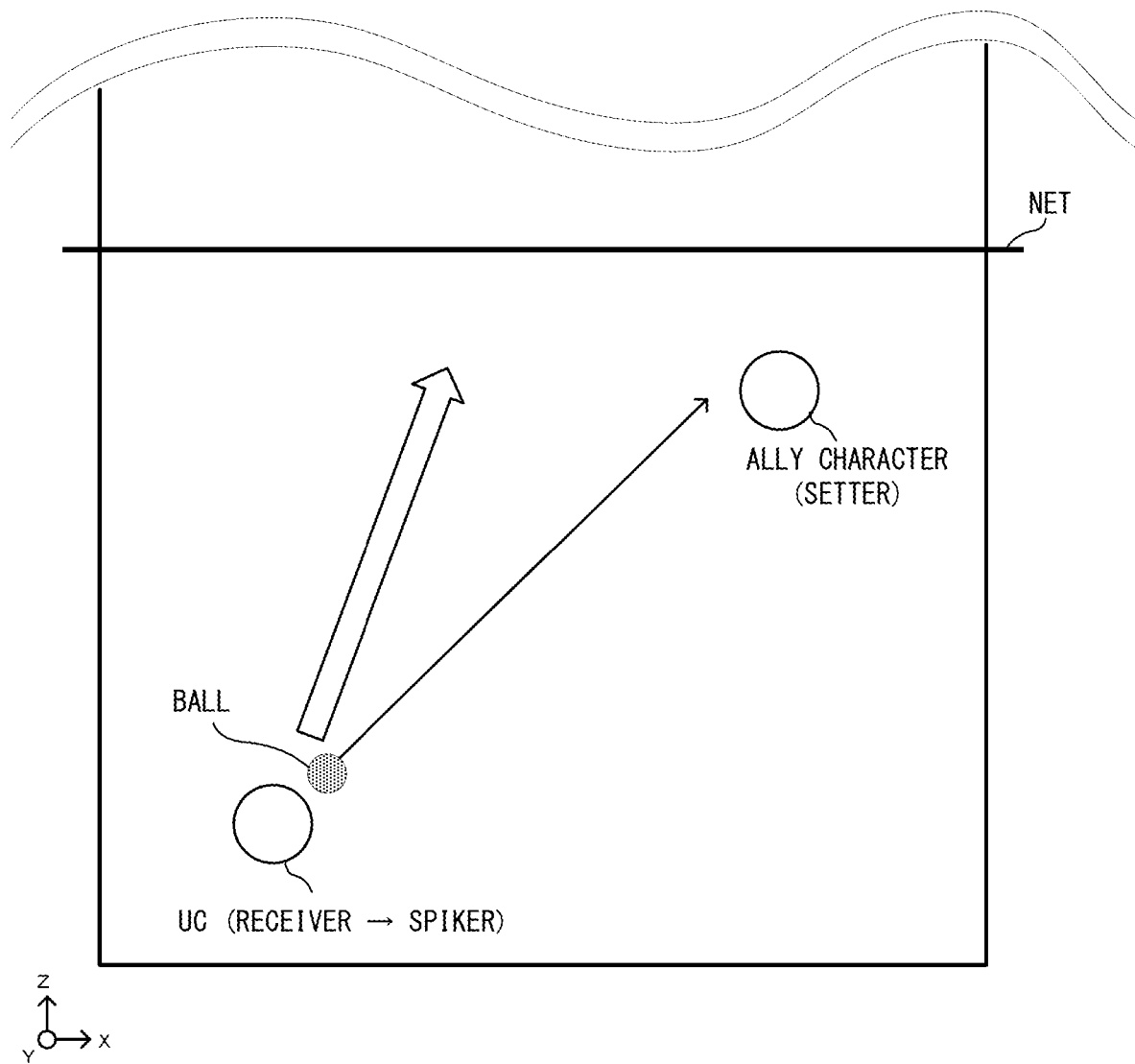
FIG. 8 is a schematic diagram showing a non-limiting example of movements of athlete characters.

FIG. 8 shows a state immediately after the UC has bumped the ball. In the example shown in FIG. 8, as a result of the bump, the ball moves toward the right front of the own court. The ally character (posturing for a toss) stands by near the predicted landing point of the ball. Immediately after the bump, the UC becomes the spiker, and auto-movement of the UC toward the net is started. In this example, not the quick spike but the normal spike is performed.

Figure 9:
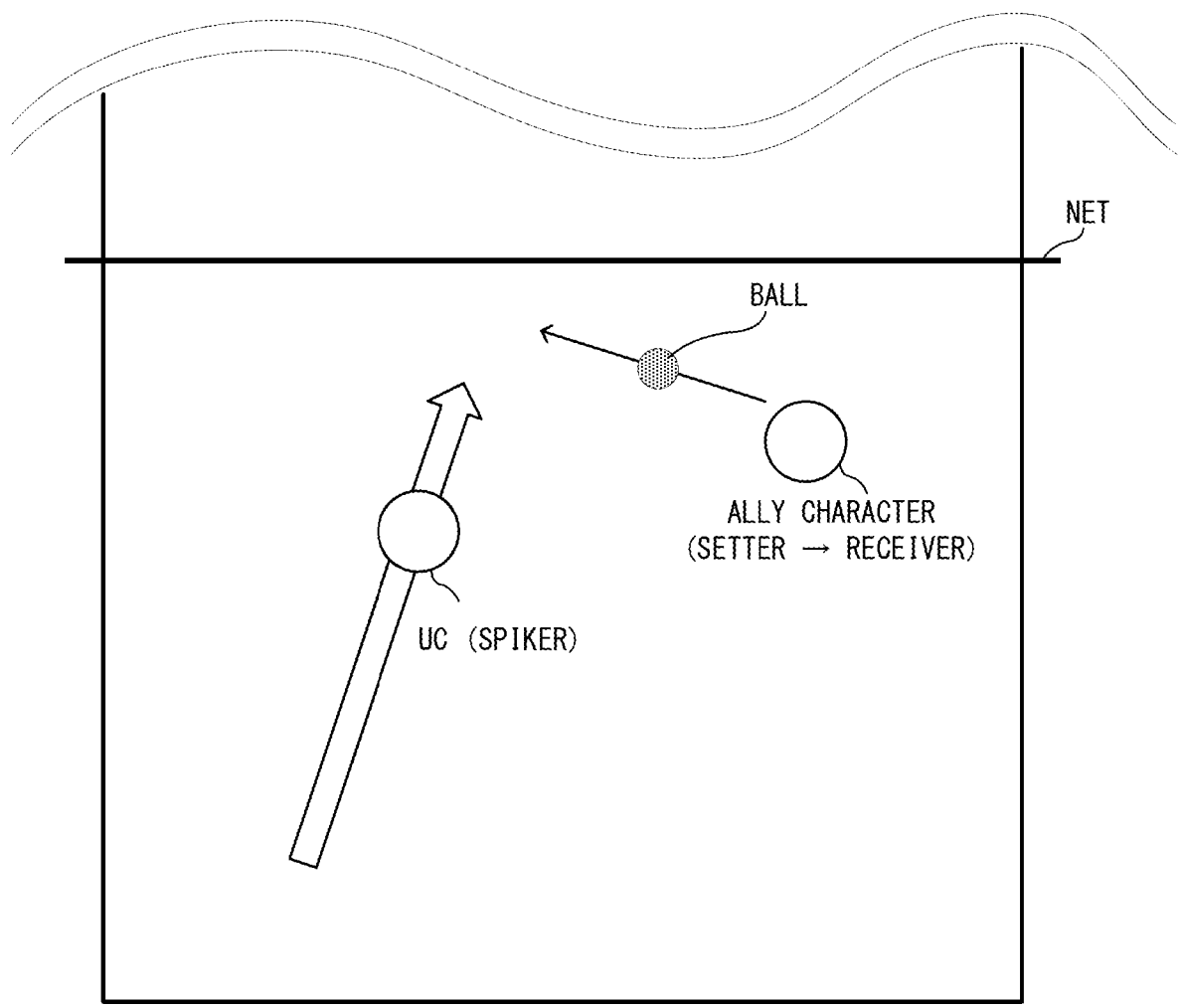
FIG. 9 is a schematic diagram showing a non-limiting example of movements of athlete characters.

FIG. 9 shows a state immediately after the ally character has tossed the ball. In FIG. 9, the ball moves obliquely frontward to the left, and the UC as the spiker is running toward the predicted landing point of the ball, through auto-movement. The ally character having tossed the ball becomes the receiver next. Thereafter, the UC hits a normal spike at the normal spike point.

Figure 10:
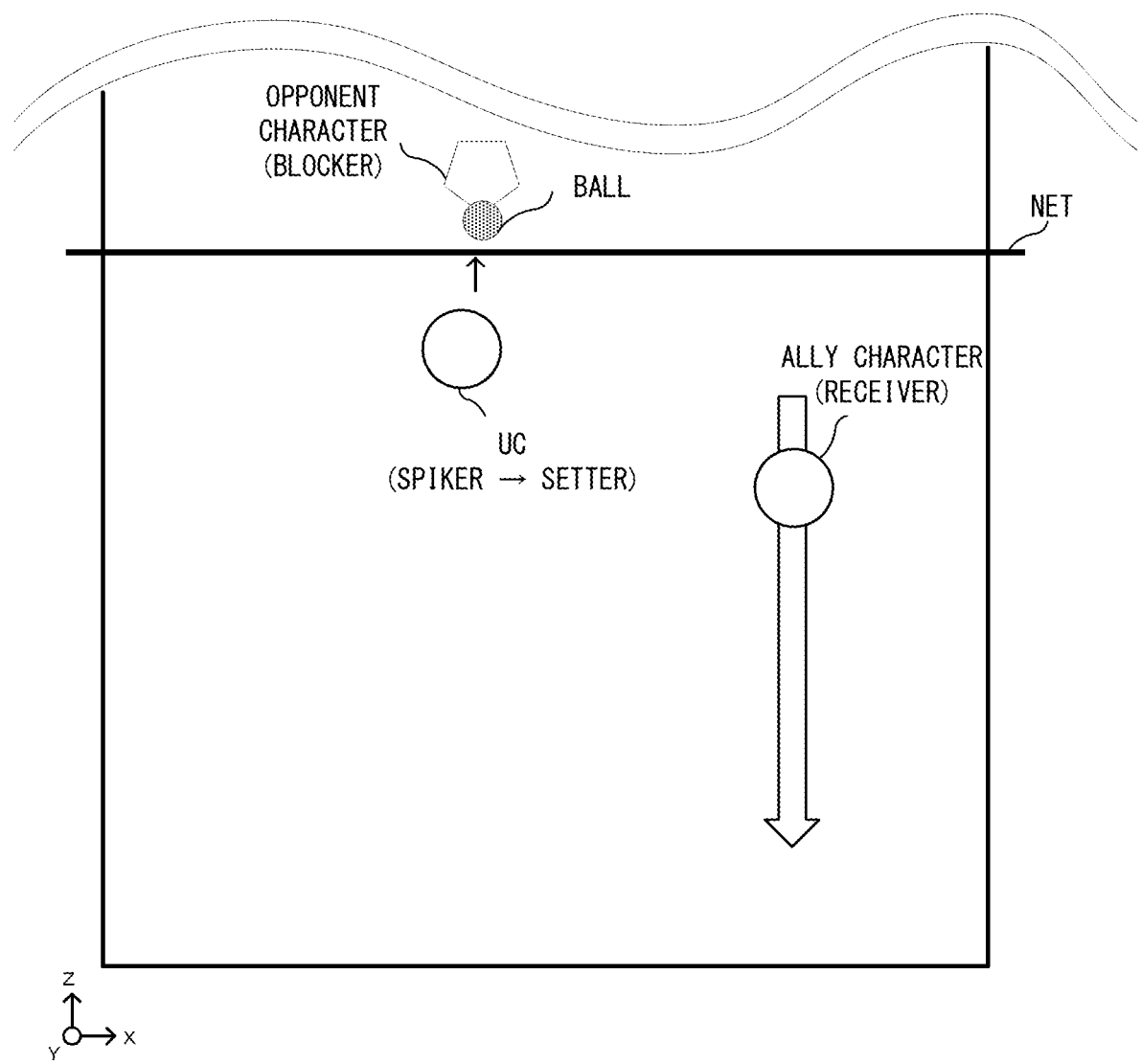
FIG. 10 is a schematic diagram showing a non-limiting example of movements of athlete characters.

FIG. 10 shows a state where the UC has just spiked the ball, and the ball is blocked (bounced back) by an opponent's blocker. In this case, auto-movement of the ally character as the receiver toward the predicted landing point of the blocked ball is performed. Since the ball has been blocked, the UC that spiked the ball becomes the setter (if the ball has not been blocked by the opponent, the UC becomes the blocker during the opponent-side ball period).

Figure 11:
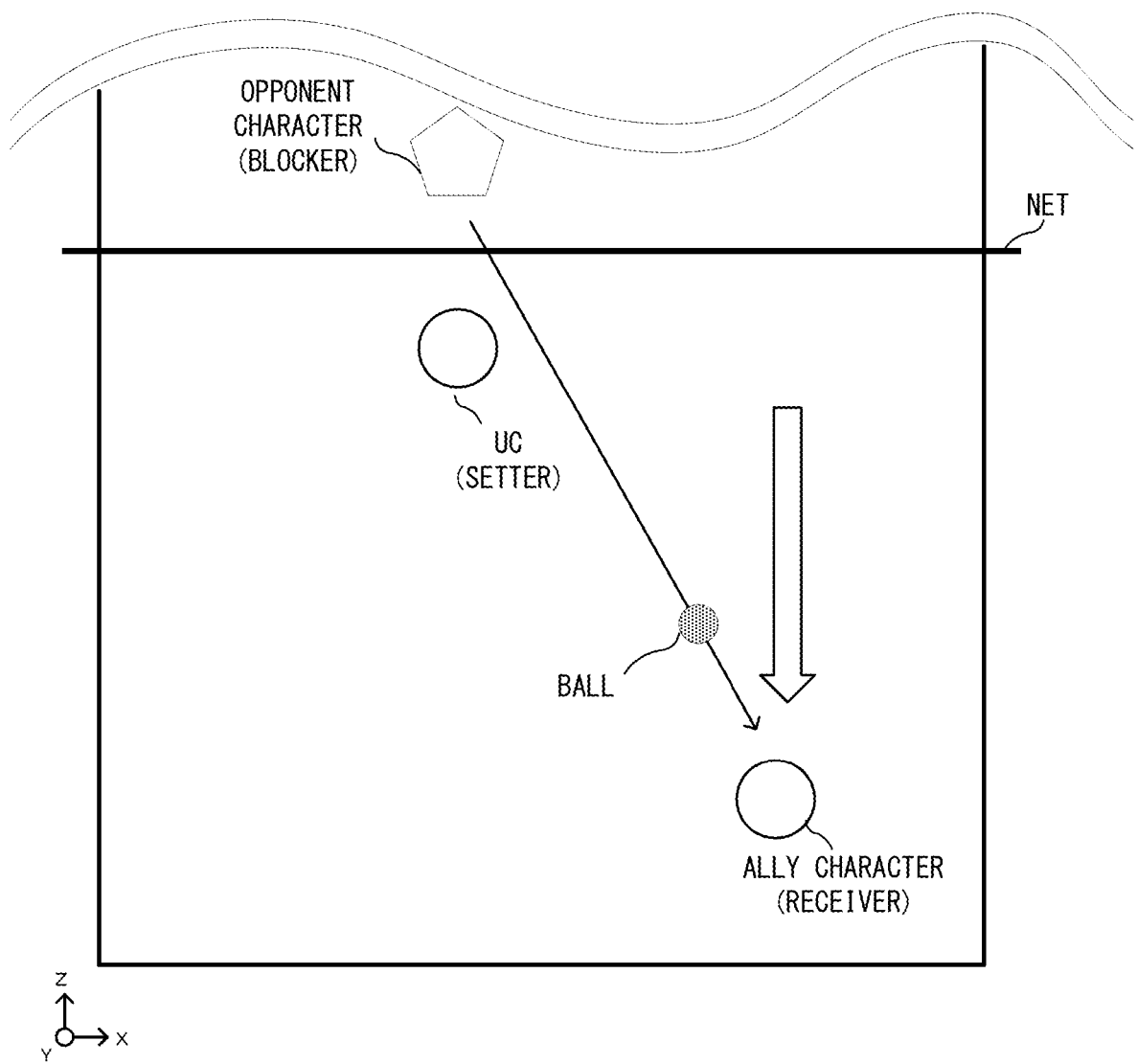
FIG. 11 is a schematic diagram showing a non-limiting example of movements of athlete characters.

FIG. 11 shows a state where the ball blocked by the opponent is moving. In FIG. 11, auto-movement of the ally character has finished, and the ally character stands by while posturing for a bump, near the predicted landing point of the ball.

Figure 12:
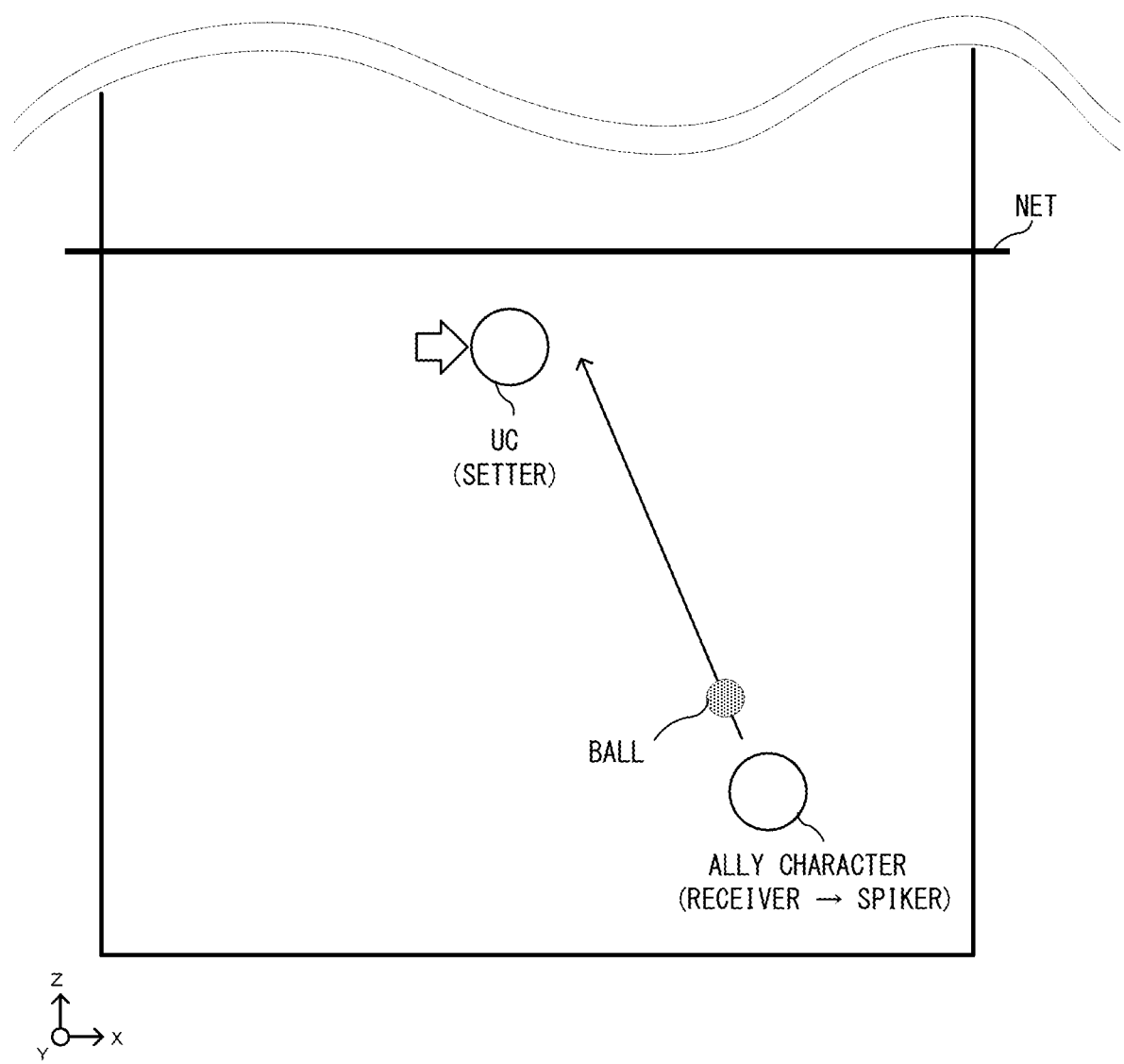
FIG. 12 is a schematic diagram showing a non-limiting example of movements of athlete characters.

FIG. 12 shows a state immediately after the ally character has bumped the blocked ball. In FIG. 12, auto-movement of the UC as the setter toward the predicated landing point of the bumped ball is performed. Next, the ally character becomes the spiker.

Figure 13:
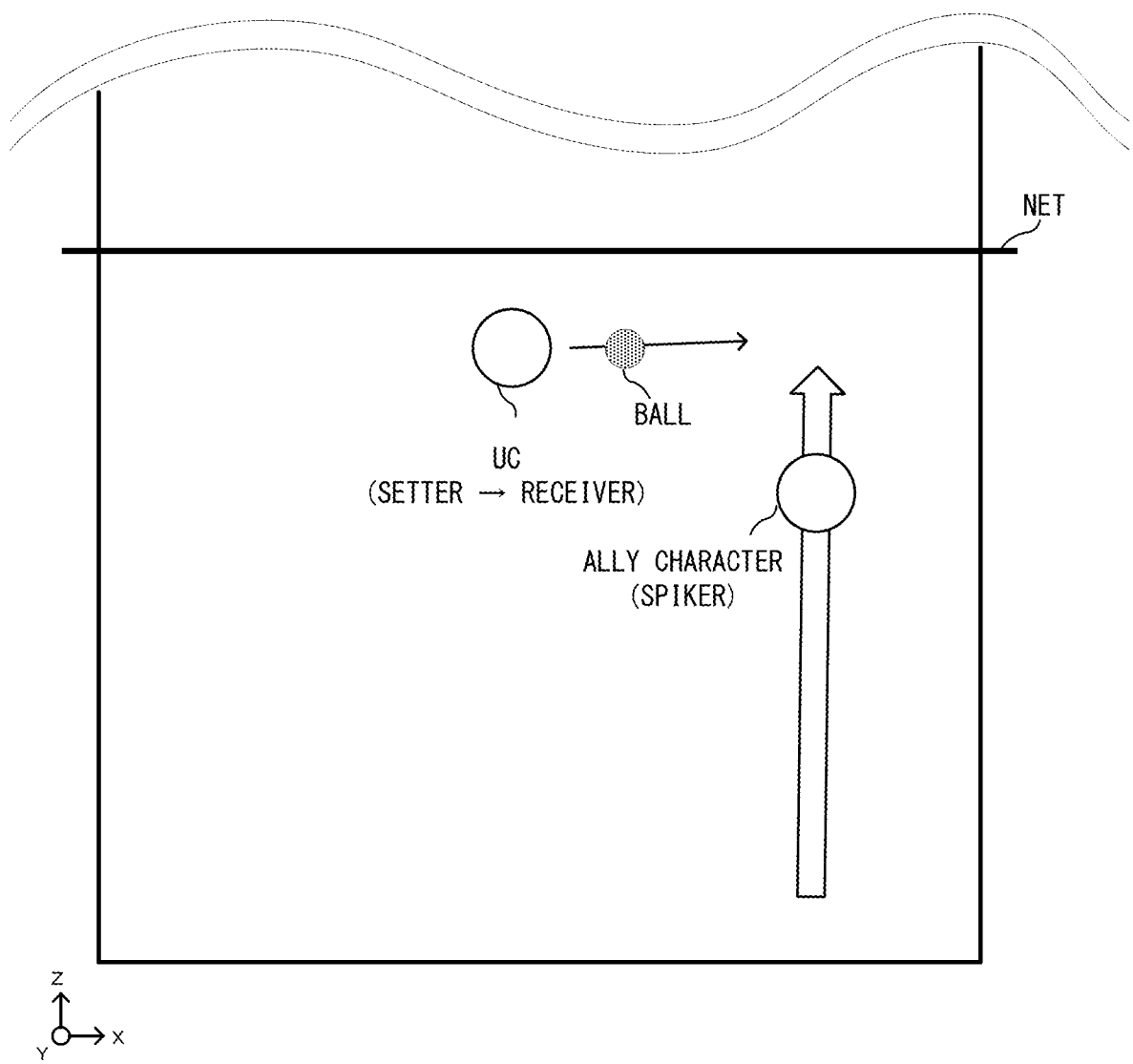
FIG. 13 is a schematic diagram showing a non-limiting example of movements of athlete characters.

FIG. 13 shows a state immediately after the UC has tossed the ball. In FIG. 13, the tossed ball is moving to the right, and the ally character is running toward the net (the predicted landing point of the tossed ball) through auto-movement.

Figure 14:
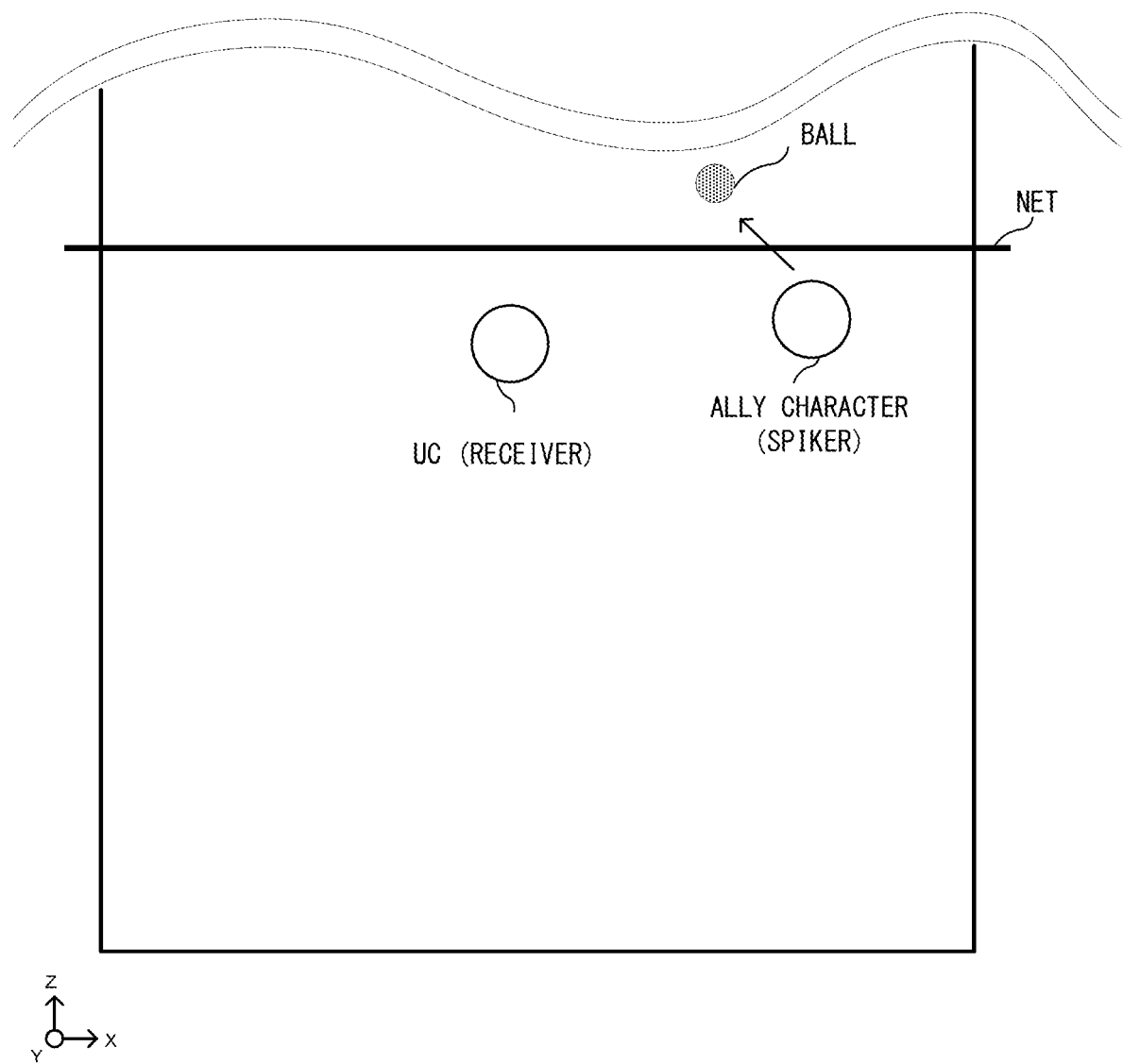
FIG. 14 is a schematic diagram showing a non-limiting example of movements of athlete characters.

Finally, FIG. 14 shows a state immediately after the ally character has spiked the ball. The spiked ball lands in the opponent court without being blocked and bumped by the opponent. Thus, a point is given to the own team. When the spiked ball has not been blocked but has been bumped by the opponent, the ally character becomes the blocker. This is the end of the description for the character's movements using the drawings.

[Ball Speed Adjustment]

In this game, from a viewpoint of game balance adjustment or the like, a control for appropriately adjusting the moving speed of the ball is performed based on the match progress or the like. Hereinafter, the ball speed adjustment is described.

First, in this game, as a rally continues for longer (as the number of times the ball moves back and forth between the courts increases), the moving speed of the ball is gradually increased. For example, the moving speed of the ball is increased by 10% for each increment of back-and-forth of the ball in the rally (an upper limit may be set). Moreover, in this game, if an in-play is interrupted and then restarted, the moving speed of the ball at the restart of the in-play is determined based on the (final) moving speed of the ball in the last in-play. Specifically, a part (e.g., 50%) of a variation in proportion of the speed at the start of the last in-play is reflected to the moving speed of the ball at the start of the current in-play. In another embodiment, 100% of the variation in the proportion may be reflected.

In this game, as described above, when a bump has occurred, a control of temporarily (until the setter tosses the ball) reducing the moving speed of the ball is performed. Thus, a time for the setter to reach the setter target point is ensured.

[Role Notification Function]

In the exemplary embodiment, since the order of assigning the roles is known in advance, a control for displaying, at an appropriate timing, a notification image indicating which role will be next assigned to the UC operated by the user, is performed. In the exemplary embodiment, since the roles of the athlete characters are successively changed in the aforementioned order, the user may not be able to keep up with his/her next role, which may confuse the user during the match. Therefore, displaying the notification at an appropriate timing enables the user to accurately recognize what to do next. Thus, the user is prevented from becoming confused about what to do next, and is allowed to comfortably play the game.

An example of the notification is as follows. For example, when the UC has bumped the ball, the next role of the UC is the spiker. In this case, after the bump of the UC, a notification image including a text message "Next, spike!" may be displayed in a predetermined position (e.g., upper left end) on the game screen for a predetermined period. As for the timing to display this notification image, the display may be started immediately after the user has finished his/her role, or a little before the timing to perform a role-related action. For example, when the UC is the setter, the next role of the UC is the receiver. In this case, a notification image including a text message "Next, bump!" is displayed. As for the timing to display this notification image, the display may be performed immediately after the UC as the setter has tossed the ball (immediately after the UC has finished its role). After the toss of the UC, the game enters an opponent-side ball period through an own spike, and the display may be performed when a toss has occurred in the opponent team. Alternatively, the display may be performed at a timing a little before occurrence of an opponent's spike after the opponent's toss, in other words, at a predetermined timing after it has been determined that the next action is an opponent's spike. However, if the display timing is too late, the advance notification becomes meaningless. Therefore, the notification may be made about 1 to 3 seconds before the timing to perform the role-related action. As for the display period of the notification, the notification may be deleted after a predetermined period, or the notification may be constantly displayed until the UC finishes the role.

[Details of Game Processing of the Exemplary Embodiment]

Next, with reference to FIG. 15 to FIG. 25, game processing according to the exemplary embodiment will be described in more detail.

[Data to be Used]

Figure 15:
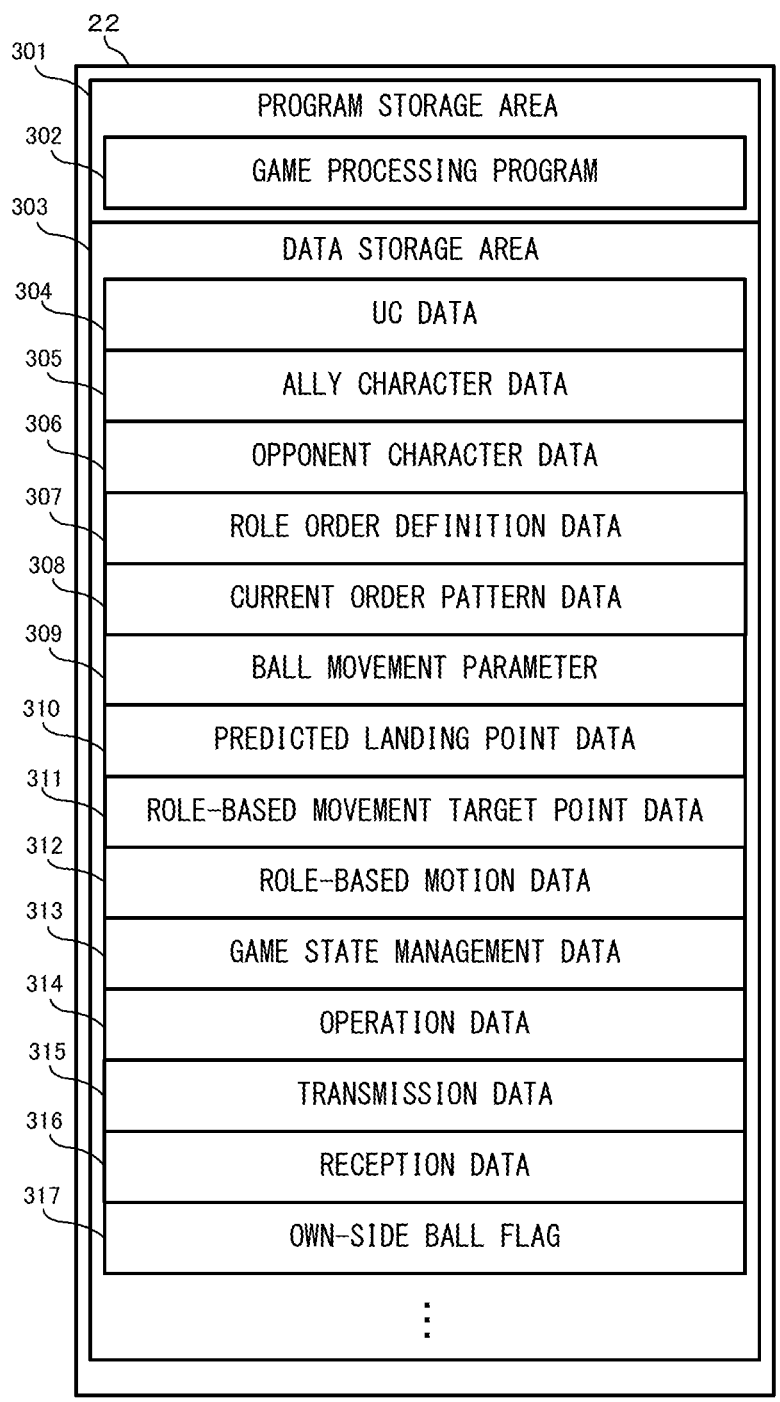
FIG. 15 is a memory map showing a non-limiting example of various types of data stored in a storage section 22.

First, various types of data to be used in this game processing will be described. FIG. 15 is a memory map showing a non-limiting example of various types of data stored in the storage section 22 of the game apparatus 2. The storage section 22 includes a program storage area 301 and a data storage area 303. A game processing program 302 is stored in the program storage area 301. The data storage area 303 has, stored therein, UC data 304, ally character data 305, opponent character data 306, role order definition data 307, current order pattern data 308, ball movement parameter 309, predicted landing point data 310, role-based movement target point data 311, role-based motion data 312, game state management data 313, operation data 314, transmission data 315, reception data 316, an own-side ball flag 317, and the like.

The game processing program 302 is a program for executing the game processing according to the exemplary embodiment.

The UC data 304 is data regarding the UC. The UC data 304 includes: data indicating a currently assigned role (hereinafter referred to as "assigned role data"); data indicating a current position in a match; data indicating whether or not a motion regarding the corresponding role action is being reproduced; model data and image data indicating the appearance of the UC; and the like.

The ally character data 305 is data regarding the ally character. The ally character data 305 includes data similar to the pieces of data included in the UC data 304. In addition, the ally character data 305 includes data for identifying the other user who operates the ally character, and the game apparatus 2 of the other user.

The opponent character data 306 is data regarding the opponent character. The opponent character data 306 includes data similar to the pieces of data included in the ally character data 305.

The role order definition data 307 is data that defines the aforementioned role orders, i.e., "order pattern A" and "order pattern B". That is, the contents shown in FIG. 2 and FIG. 3 are stored as data.

The current order pattern data 308 is data that designates the pattern of the role order to be used in the current in-play, i.e., either the "order pattern A" or the "order pattern B".

The ball movement parameter 309 includes various kinds of parameters to be used for the aforementioned ball movement control. For example, data indicating the moving direction, moving speed, and power of the ball are included.

The predicted landing point data 310 is data indicating the predicted landing point of the ball.

The role-based movement target point data 311 is data indicating the aforementioned movement target point, for each role and for each of the own team and the opponent team. For example, the role-based movement target point data 311 indicates an "own team's receiver target point", an "opponent team's setter target point", and the like. As for the spiker, as described above, two movement target points, i.e., a quick point and a normal spike point, are stored.

The role-based motion data 312 is data that defines, for each role, a motion to be reproduced when an athlete character performs the corresponding role-related action.

The game state management data 313 has, stored therein, various kinds of data for managing the game progress. For example, data indicating: the team having the right to serve; the score of each team; the number of back-and-forth movements of the ball in each in-play; and the like, are included.

The operation data 314 is data indicating the contents of operations performed to the controller 4. In the exemplary embodiment, data indicating the press state with respect to the button section 43 such as a cross key, and the input state with respect to the analog stick 42, are included. The content of the operation data 314 is updated in a predetermined cycle, based on a signal from the controller 4 (communication section 41).

The transmission data 315 is data to be transmitted to another game apparatus 2, and is data including at least information for identifying the transmission source and the content of the operation data 314.

The reception data 316 is data stored such that the transmission data 315 received from other game apparatuses 2 can be discerned for each of the other game apparatuses.

The own-side ball flag 317 is a flag for indicating whether the game is currently in the own-side ball period or the opponent-side ball period. This flag indicates the own-side ball period when it is ON, and indicates the opponent-side ball period when it is OFF.

Other than the above, various types of data to be used in the game processing are stored in the storage section 22 according to need.

[Details of Processing Executed by Processor 21]

Next, the game processing according to the exemplary embodiment will be described in detail. FIG. 16 is a flowchart showing the game processing in detail. Execution of the game processing is started according to a user operation that instructs start of a match, for example. In advance of execution of the processing, users participating in the game have already been divided into teams. This flowchart is merely an example of the processing. Therefore, the order of each process step may be changed as long as the same result is obtained. In addition, the values of variables and thresholds used in determination steps are also merely examples, and other values may be used as necessary.

In FIG. 16, first, in step S1, the processor 21 performs a preparation process. This process is for performing various preparations for starting the game. Specifically, the processor 21 constructs a virtual game space in which a virtual volleyball court is present, and arranges, in an own court and an opponent court, athlete characters of the corresponding teams. In addition, the processor 21 initializes the various kinds of data to be used in the game processing.

Figure 17:
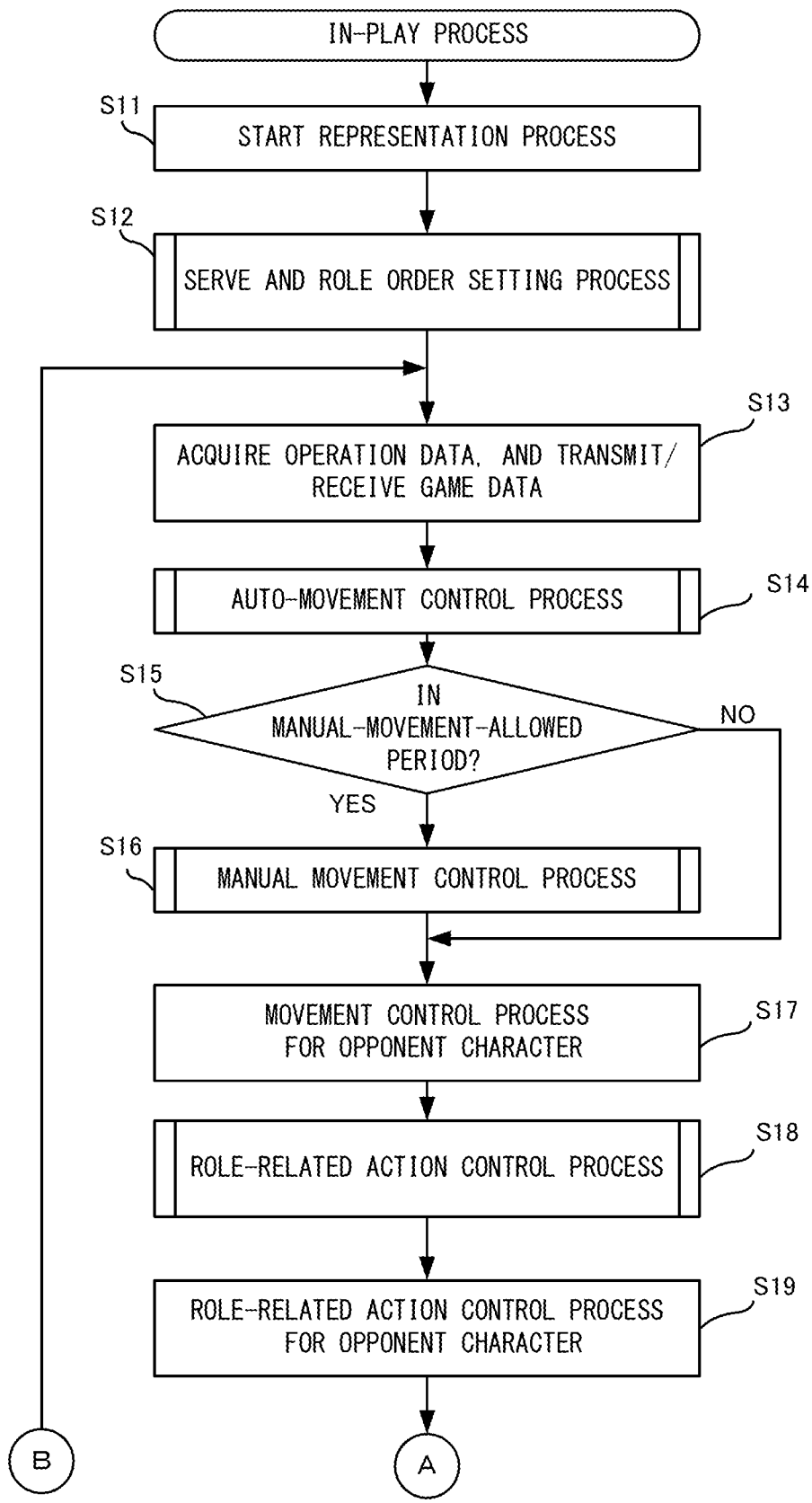
FIG. 17 is a flowchart showing an in-play process in detail.
Figure 18:
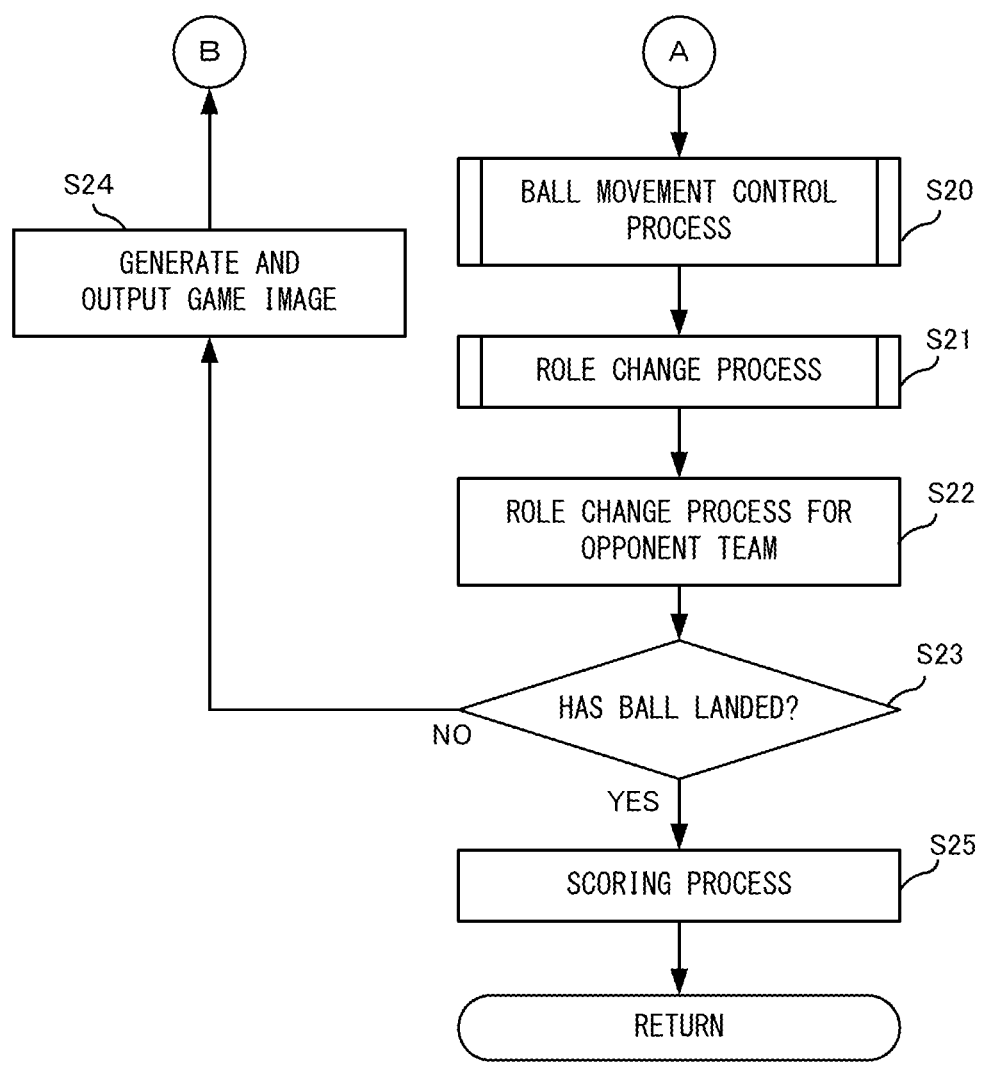
FIG. 18 is a flowchart showing the in-play process in detail.

Next, in step S2, the processor 21 performs an in-play process. This process relates to an in-play as described above. FIG. 17 and FIG. 18 are flowcharts showing the in-play process in detail. A loop of processes in steps S13 to S24 shown in FIG. 17 and FIG. 18 is repeatedly performed in each frame. In FIG. 17, first, in step S11, the processor 21 performs a start representation process. For example, the processor 21 recognizes the current score and the like with reference to the game state management data 313. If the match has just started, a predetermined representation indicating "Match starts!" or the like is displayed. If the game is at match point, a predetermined representation indicating the same is displayed.

Figure 19:
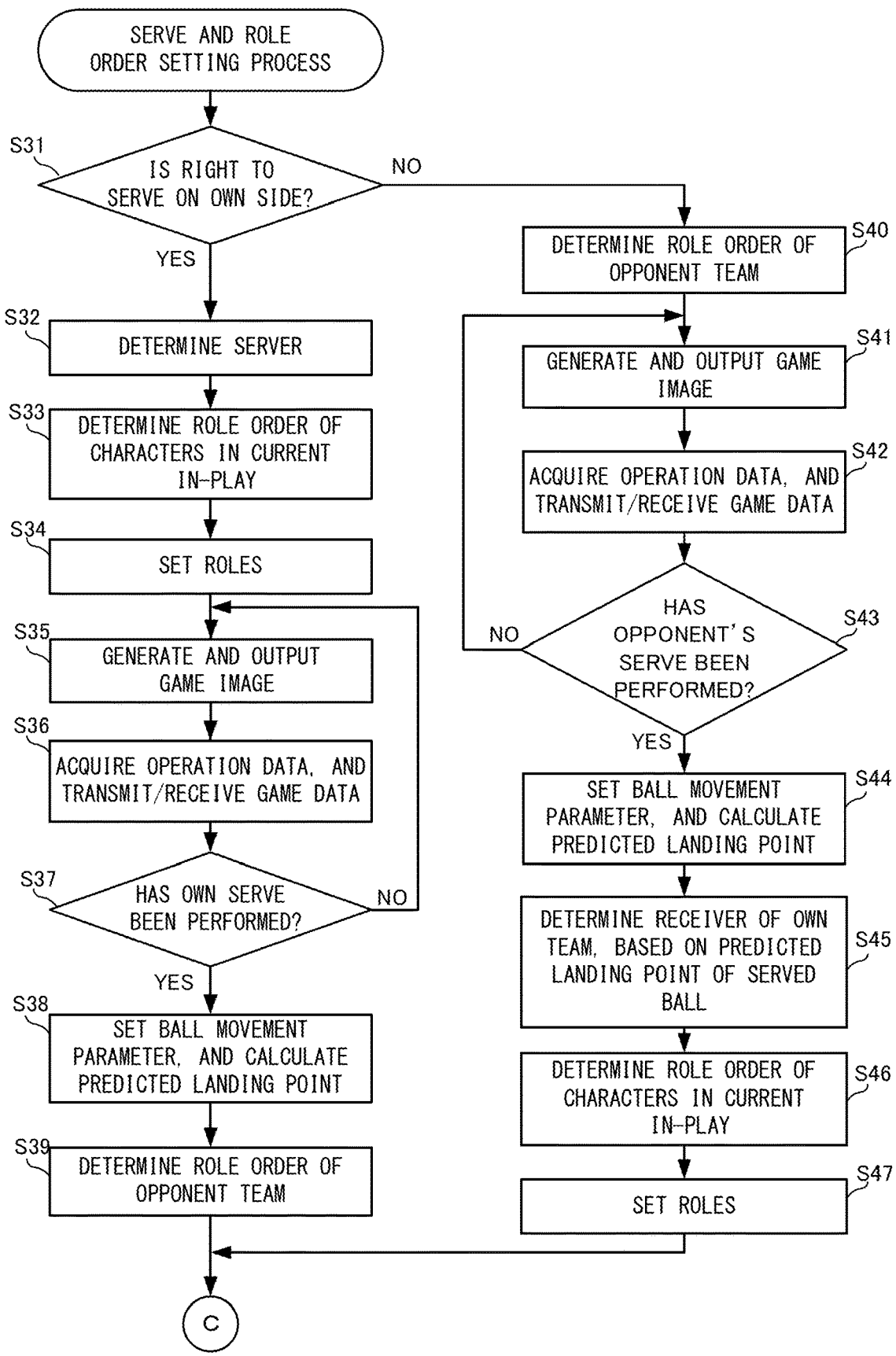
FIG. 19 is a flowchart showing a serve and role order setting process in detail.
Figure 20:
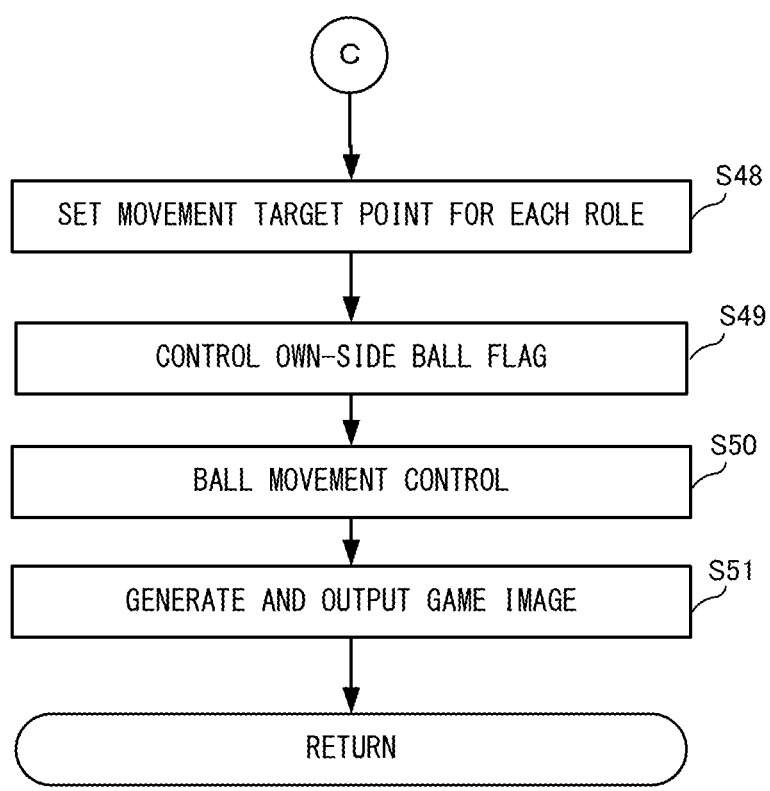
FIG. 20 is a flowchart showing the serve and role order setting process in detail.

After the start representation process, in step S12, the processor 21 performs a serve and role order setting process. This process is for determining a serve, and an order pattern of the role order (in the current in-play). FIG. 19 and FIG. 20 are flowcharts showing the serve and role order setting process in detail. First, in step S31 in FIG. 19, the processor 21 determines whether or not the own team has the right to serve, with reference to the game state management data 313. When the own team has the right to serve, in step S32, the processor 21 determines an athlete character to be the server, according to the progress state of the game, with reference to the game state management data 313. In this example, the 1P-side athlete character first takes the role of the server.

Next, in step S33, the processor 21 determines a role order in the current in-play, based on which athlete character takes the role of the server. That is, if the server is the 1P-side athlete character, the processor 21 sets the "order pattern A" in the current order pattern data 308. If the server is the 2P-side athlete character, the processor 21 sets the "order pattern B" in the current order pattern data 308.

Next, in step S34, the processor 21 sets the contents of the assigned role data of the UC and the ally character, based on the role order definition data 307 and the current order pattern data 308. That is, the processor 21 sets any of the server, the receiver, the setter, the spiker, and the blocker, based on the order pattern.

Next, in step S35, the processor 21 captures the virtual space with the virtual camera to generate a game image, and displays the game image on the display section 5. At this time, a game screen showing the state before start of a serve is displayed.

Next, in step S36, the processor 21 acquires the operation data 314. Furthermore, the processor 21 generates the transmission data 315, based on the operation data 314. Then, the processor 21 transmits the transmission data 315 to the other game apparatus 2 that participates in the match, receives the transmission data 315 transmitted from the other game apparatus 2, and stores the transmission data 315 as the reception data 316.

Next, in step S37, the processor 21 determines whether or not a serve operation of the own team has been performed, based on the operation data 314 and the reception data 316.

As a result of the determination, when the serve operation has not been performed (NO in step S37), the processor 21 returns to step S35 and repeats the process. When the serve operation has been performed (YES in step S37), the processor 21, in step S38, causes the athlete character to perform a motion of a serve, based on the swing direction, the swing timing, etc., of the controller 4. Then, the processor 21 sets the content of the ball movement parameter 309, based on the content of a contact between (the arm of) the athlete character and the ball regarding the serve. If the current in-play corresponds to the second or subsequent in-play from the game start, the processor 21 determines the moving speed of the ball, based on the moving speed of the ball at the end of the last in-play. Specifically, the processor 21 sets the content of the ball movement parameter 309 such that 50% of the proportion of the moving speed increased in the last in-play is reflected to the moving speed of the ball at the serve of the current in-play (at the start of the in-play). For example, if the moving speed of the ball has been increased in the last in-play by 50% with respect to the standard speed, the processor 21 sets the content of the ball movement parameter 309 such that the moving speed of the ball at the start of the current in-play is increased by 25% with respect to the standard speed. Moreover, based on the set ball movement parameter 309, the processor 21 calculates a predicted landing point of the ball, and stores the same as the predicted landing point data 310.

Next, in step S39, the processor 21 performs a process of determining a role order regarding the opponent team, based on the predicted landing point. That is, the processor 21 determines a receiver of the opponent team, based on the predicted landing point of the served ball, and determines the order pattern of the opponent team accordingly. Thereafter, the process proceeds to step S48 described later.

Meanwhile, when the result of the determination in step S31 is that the opponent team has the right to serve (NO in step S31), the processor 21 determines a role order regarding the opponent team in step S40.

Next, in step S41, the processor 21 captures the virtual space with the virtual camera to generate a game image, and displays the game image on the display section 5. At this time, a game screen showing the state where a serve of the opponent team is being waited for is displayed.

Next, in step S42, the processor 21 performs acquisition of the operation data 314, transmission of the transmission data 315 to the other game apparatus 2, and reception of the transmission data 315 from the other game apparatus 2. Since this process is identical to the process in step S36, repeated description is not necessary.

Next, in step S43, the processor 21, based on the reception data 316, determines whether or not a serve operation regarding the opponent team has been performed. As a result of the determination, when the serve operation has not been performed (NO in step S43), the processor 21 returns to step S41 and repeats the process. When the serve operation regarding the opponent team has been performed (YES in step S43), the processor 21, in step S44, sets the content of the ball movement parameter 309 through the same process as in step S38. Furthermore, the processor 21 calculates a predicted landing point of the ball, and stores the same as the predicted landing point data 310.

Next, in step S45, the processor 21 determines an athlete character to be the receiver (first receiver in the current in-play), based on the predicted landing point of the served ball.

Next, in step S46, the processor 21 determines a role order in the current in-play, based on which athlete character has been determined as the receiver. That is, the processor 21 sets the "order pattern A" in the current order pattern data 308 when the receiver is the 1P-side athlete character, and sets the "order pattern B" in the current order pattern data 308 when the receiver is the 2P-side athlete character.

Next, in step S47, the processor 21 sets the contents of the assigned role data of the UC and the ally character, based on the role order definition data 307 and the current order pattern data 308.

Next, in step S48 in FIG. 20, the processor 21, based on the predicted landing point, calculates a movement target point of each role, for each of the own team and the opponent team, and stores the same in the role-based movement target point data 311.

Next, in step S49, the processor 21 appropriately changes the content of the own-side ball flag 317. That is, when the serve of the own team has been performed, the own-side ball flag 317 is set to OFF. When the serve of the opponent team has been performed, the own-side ball flag 317 is set to ON.

Next, in step S50, the processor 21 moves the ball, based on the ball movement parameter 309.

Next, in step S51, the processor 21 generates a game image, and displays the game image on the display section 5. At this time, a game screen showing a state immediately after a serve performed by the own team or the opponent team, is displayed. This is the end of the serve and role order setting process.

Referring back to FIG. 17, in step S13, the processor 21 performs acquisition of the operation data 314, transmission of the transmission data 315 to the other game apparatus 2, and reception of the transmission data 315 from the other game apparatus 2, through the same process as in step S36.

Next, in step S14, the processor 21 perform an auto-movement control process.

Figure 21:
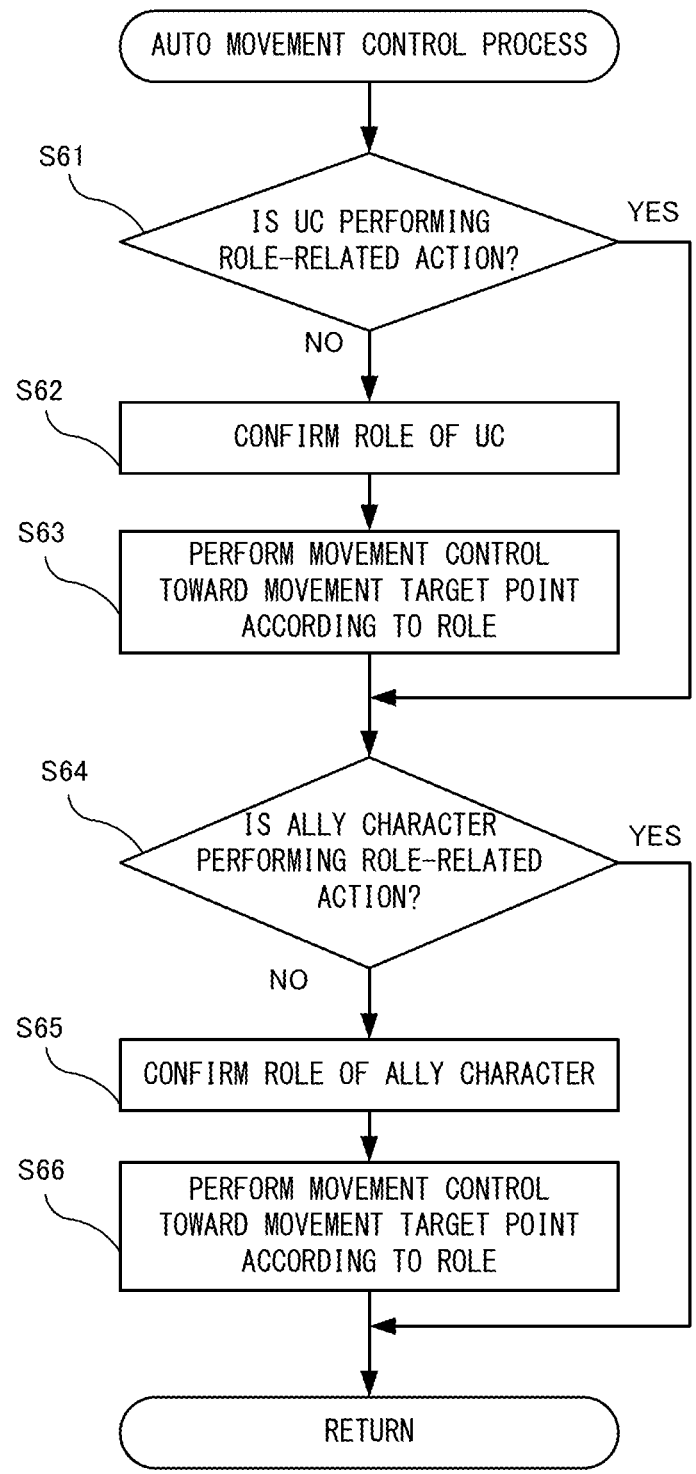
FIG. 21 is a flowchart showing an auto-movement control process in detail.

FIG. 21 is a flowchart showing the auto-movement control process in detail. In FIG. 21, in step S61, the processor 21 determines whether or not the UC is currently performing a predetermined role-related action (whether or not a motion is being reproduced). For example, this determination can be made based on data that is included in the UC data 304 and indicates whether or not a motion regarding the role-related action is being reproduced. As a result of the determination, when the UC is performing the role-related action (YES in step S61), the process proceeds to step S64 described later. When the UC is not performing the role-related action (NO in step S61), the processor 21, in step S62, determines the current role of the UC with reference to the assigned role data.

Next, in step S63, the processor 21 moves the UC toward the movement target point corresponding to each role, with reference to the role-based movement target point data 311.

Next, the processor 21 performs, for the ally character, the same process as described above. That is, in step S64, the processor 21 determines whether or not the ally character is currently performing a predetermined role-related action. For example, this determination can be made based on data that is included in the ally character data 305 and indicates whether or not a motion regarding the role-related action is being reproduced. As a result of the determination, when the ally character is performing the role-related action (YES in step S64), the auto-movement control process is ended. When the ally character is not performing the role-related action (NO in step S64), the processor 21, in step S65, determines the current role of the ally character with reference to the assigned role data.

Next, in step S66, the processor 21 moves the ally character toward the movement target point corresponding to each role, with reference to the role-based movement target point data 311. This is the end of the auto-movement control process.

Referring back to FIG. 17, in step S15, the processor 21 determines whether or not the game is currently in the manual-movement-allowed period. As a result of the determination, when the game is currently not in the manual-movement-allowed period (NO in step S15), the processor 21 proceeds the process to step S17 described later. When the game is currently in the manual-movement-allowed period (YES in step S15), the processor 21 performs a manual movement control process in step S16.

Figure 22:
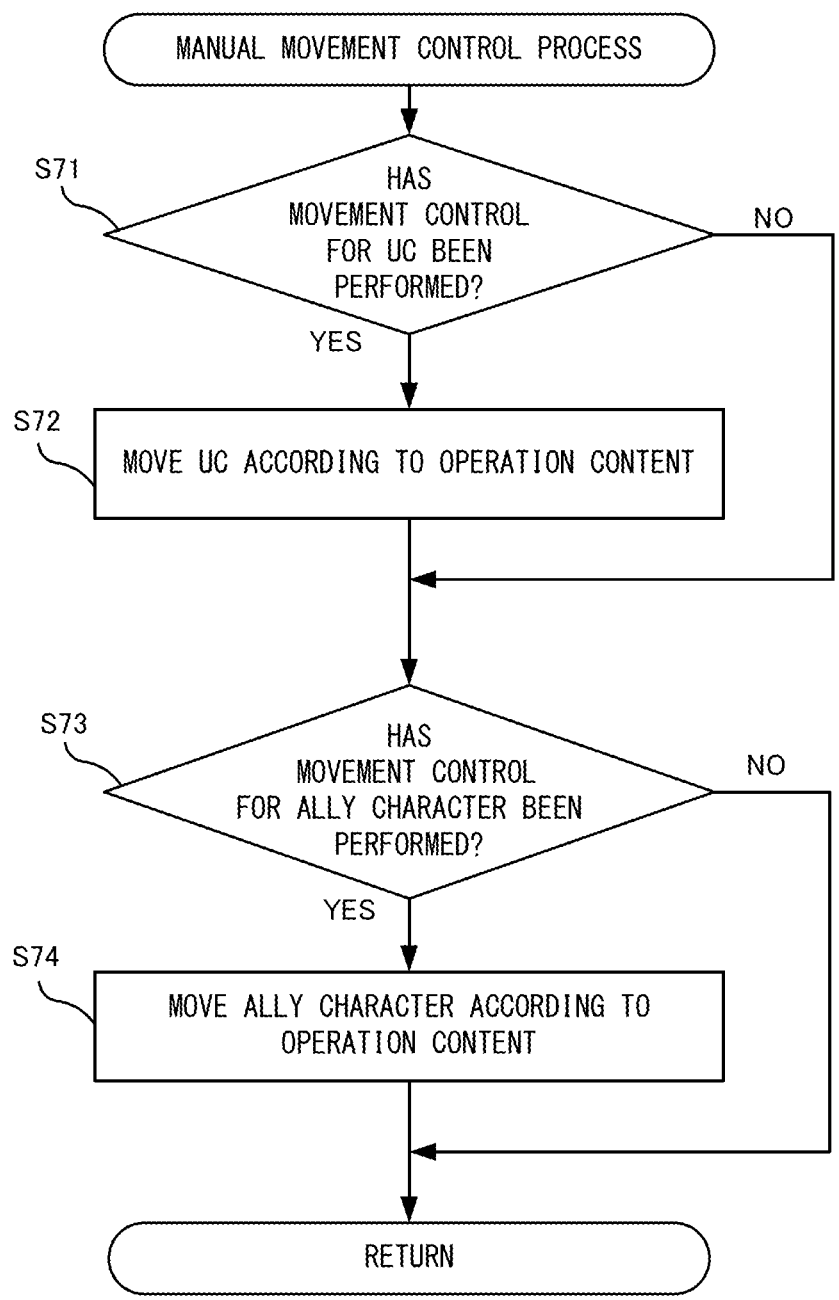
FIG. 22 is a flowchart showing a manual movement control process in detail.

FIG. 22 is a flowchart showing the manual movement control process in detail.

In step S71, the processor 21, based on the operation data 314, determines whether or not an operation of moving the UC (in this example, an operation to the analog stick 42) has been performed. When the movement operation has been performed (YES in step S71), the processor 21, in step S72, moves the UC based on the content of the operation. When the movement operation has not been performed (NO in step S71), the process in step S72 is skipped.

Next, in step S73, the processor 21, based on the reception data 316, determines whether or not a movement operation for the ally character has been performed. As a result of the determination, when the movement operation has been performed (YES in step S73), the processor 21, in step S74, moves the ally character based on the content of the operation. When the movement operation has not been performed (NO in step S73), the process in step S74 is skipped. This is the end of the manual movement control process.

Referring back to FIG. 17, in step S17, the processor 21 performs a movement control process for an opponent character. In this process, based on the reception data 316, the auto-movement control process or the manual movement control process for the opponent character is performed.

Figure 23:
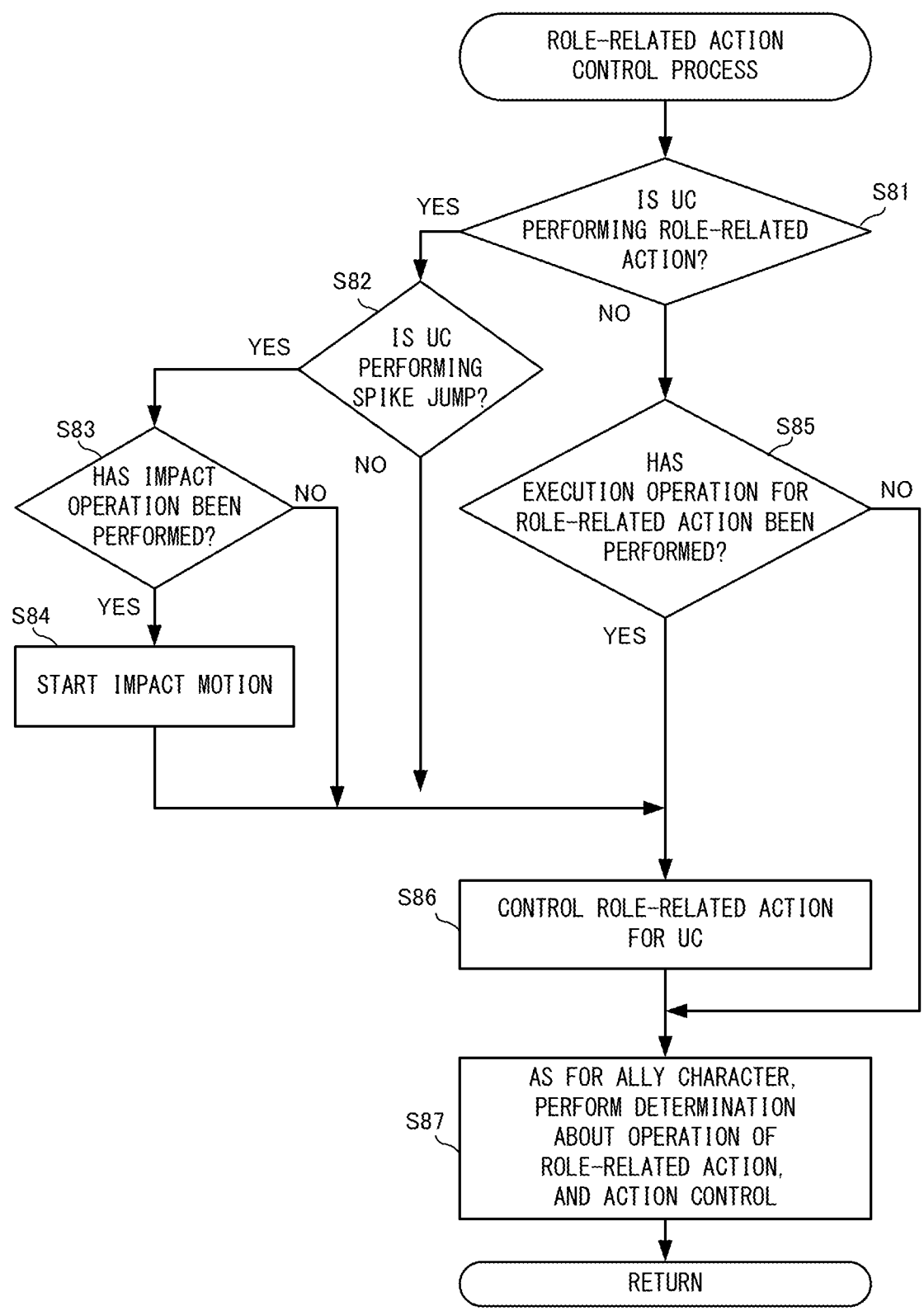
FIG. 23 is a flowchart showing a role-related action control process in detail.

Next, in step S18, the processor 21 performs a role-related action control process. In this process, it is determined whether or not an operation for realizing a role-related action (e.g., the bump operation) has been performed, and, based on a result of the determination, the role-related action of each athlete character is controlled as appropriate. FIG. 23 is a flowchart showing the role-related action control process in detail. As for steps S81 to S85 in FIG. 23, for convenience in description, a case where the role of the UC is other than the spiker will be described first, and thereafter, a case where the role of the UC is the spiker will be described.

In step S81, the processor 21 determines whether or not the UC is currently performing the role-related action. As a result of the determination, when the UC is currently performing the role-related action (YES in step S81), the process proceeds to step S82 described later. When the UC is currently not performing the role-related action (NO in step S81), in step S85, the processor 21, based on the operation data 314, determines whether or not an execution operation for the role-related action according to the role of the UC at that time has been performed. Specifically, when the role of the UC is the receiver, whether or not a bump operation has been performed is determined. When the role of the UC is the setter, whether or not a toss operation has been performed is determined. When the role of the UC is the blocker, whether or not a block jump operation has been performed is determined (a case where the role of the UC is the spiker will be described later).

As a result of the determination, when the execution operation for the role-related action corresponding to the role of the UC at that time has been performed (YES in step S85), in step S86, the processor 21, based on the content of the role-based motion data 312, performs a control for the role-related action corresponding to the role. For example, when the role is the receiver, a reproduction control for a bumping motion is performed. Specifically, if the motion of the receiver has not been started, the bumping motion is started. If the motion is being reproduced, control for continuing the reproduction (until the motion ends) is performed. At this time, for the UC, a hit determination area used for determining a hit against the ball is set as appropriate at a position according to the role. The hit determination area can be shifted according to change in the motion (e.g., change in the position of the arm). Thereafter, the process proceeds to step S87 described later.

Meanwhile, as the result of the determination in step S85, when the execution operation for the role-related action corresponding to the role of the UC at that time has not been performed (NO in step S85), step S86 is skipped, and the process proceeds to step S87 described later.

Next, a case where the role of the UC is the spiker is described. As described above, the spike operation is composed of two stages of operations, i.e., the spike jump operation and the impact operation. Therefore, to be exact, there are two role-related actions regarding a spike, i.e., a spike jump action and an impact action. Therefore, taking this into account, the processing flow is as described below. First, in step S81, whether or not the UC is currently performing the role-related action is determined. In the case of a spike, if the UC is performing one of the spike jump action and the impact action, it is determined that the UC is performing the role-related action. As a result of the determination, when the UC is performing the role-related action (YES in step S81), whether or not the role-related action is the spike jump action is determined in step S82. As a result of the determination, when the role-related action is not the spike jump action (NO in step S82), the process proceeds to step S86, and the control for the role-related action being currently performed is continued.

Meanwhile, as the result of the determination in step S82, when the role-related action is the spike jump action (YES in step S82), in step S83, the processor 21, based on the operation data 314, determines whether or not the impact operation has been performed. As a result of the determination, when the impact operation has been performed, the processor 21, in step S84, starts a motion regarding an impact. Then, the process proceeds to step S86. Thereafter, in this process, an action control for continuing reproduction of the motion regarding the impact is performed. Meanwhile, when the impact operation has not been performed (NO in step S83), the process proceeds to step S86. In this case, a control for continuing reproduction of the motion regarding the spike jump is performed.

Next, in step S87, the processor 21 performs, for the ally character, determination of presence/absence of an execution operation for a role-related action, and a control for the role-related action. That is, the processor 21 performs the same processes as those in steps S81 to S86 by using, instead of the aforementioned operation data 314, the operation data 314 for the other user included in the reception data 316.

This is the end of the role-related action control process.

Referring back to FIG. 17, in step S19, the processor 21 performs a role-related action control process for an opponent character. In this process, a process similar to the role-related action control process in step S18 is performed for an opponent character, based on (the opponent team's operation data 314 included in) the reception data 316. Therefore, details of the process need not be described.

Figure 24:
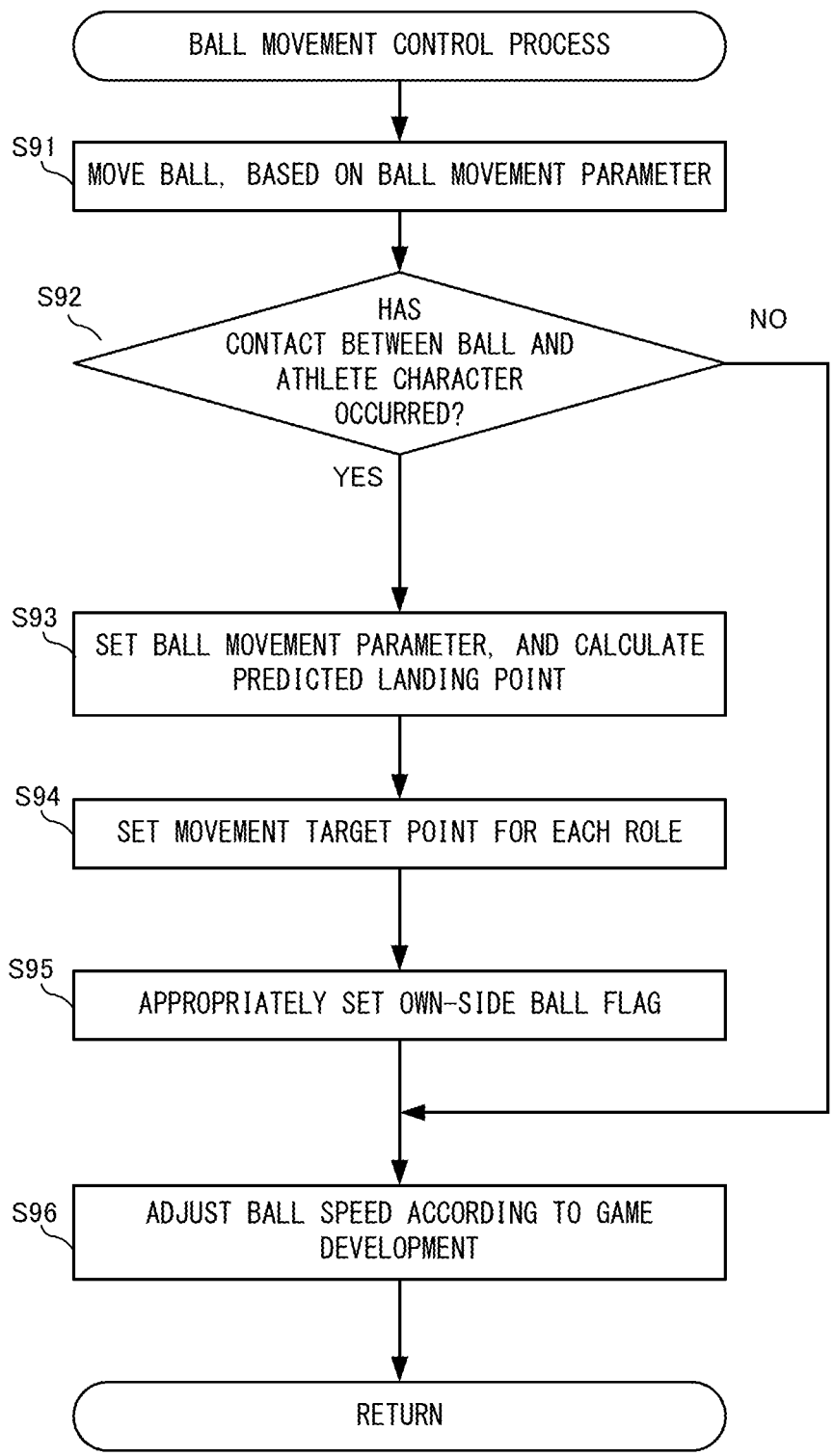
FIG. 24 is a flowchart showing a ball movement control process in detail.

Next, in step S20 in FIG. 18, the processor 21 performs a ball movement control process. FIG. 24 is a flowchart showing the ball movement control process in detail. First, in step S91, the processor 21 moves the ball, based on the ball movement parameter 309. Next, in step S92, the processor 21 determines whether or not a contact between any athlete character and the ball has occurred. Specifically, the processor 21 determines whether or not a contact between an athlete character and the ball due to a bump, a toss, a spike, or a block has occurred (the process in step S12 deals with a serve).

As a result of the determination, when a contact between an athlete character and the ball has not occurred (NO in step S92), the process proceeds to step S96 described later. Meanwhile, when such a contact has occurred (YES in step S92), the processor 21, in step S93, calculates the content of the ball movement parameter 309 based on the content of the contact, and furthermore, calculates predicted landing point data 310. Specifically, the processor 21 calculates parameters such as a moving direction, a moving speed, etc., of the ball, based on the content (the swing direction, the swing speed, etc.) of the operation performed to the controller 4 when the contact occurred, and on the occurrence timing of the contact. The processor 21 sets the calculated parameters as the ball movement parameter 309. For example, when the receiver or the setter comes into contact with the ball, the content of the ball movement parameter 309 is calculated based on the content of the bump operation or the toss operation. For example, parameters such as a moving direction, a moving speed, etc., of the ball may be calculated based on a difference between a timing that is set in advance as a best timing and a timing at which the contact has actually been detected.

In the case of a contact between the spiker and the ball, the content of the ball movement parameter 309 is calculated based on the content of the impact operation such that the ball moves toward the opponent court. In the case of a contact between the blocker and the ball, first, whether the contact corresponds to the "one touch" or the "bounce back" is determined based on whether or not the contact has occurred within the hang time. In the case of the "one touch", the content of the ball movement parameter 309 is calculated such that only the moving speed of the ball is reduced, or the moving direction of the ball is slightly adjusted while keeping the rough moving direction toward the own court. In the case of the "bounce back", the content of the ball movement parameter 309 is calculated such that the moving direction of the ball is toward the opponent court. Furthermore, the processor 21 calculates a predicted landing point of the ball, based on the calculated ball movement parameter 309, and stores the predicted landing point as predicted landing point data 310.

Next, in step S94, the processor 21, based on the predicted landing point data 310, calculates a movement target point for each role, and stores the movement target point as role-based movement target point data 311. As for the spiker, two movement target points, i.e., a quick point and a normal spike point, are calculated as described above.

Next, in step S95, the processor 21 performs setting of the own-side ball flag 317. Specifically, when a spike has occurred on the own team side, the processor 21 sets the own-side ball flag 317 to OFF. When a spike has occurred on the opponent team side, the processor 21 sets the own-side ball flag 317 to ON. Also, when a block resulting in "bounce back" has occurred, the own-side ball flag 317 is set similarly to the case of a spike. That is, when "bounce back" has occurred on the own team side, the own-side ball flag 317 is set to OFF. When "bounce back" has occurred on the opponent team side, the own-side ball flag 317 is set to ON. If a contact between an athlete character and the ball, other than the above, has occurred, the content of the own-side ball flag 317 is not changed.

Next, in step S96, the processor 21 adjusts the moving speed of the ball according to the game progress. In the exemplary embodiment, when a bump has occurred, the ball movement parameter 309 is adjusted so as to temporarily (until a toss occurs next) reduce the moving speed of the ball. The processor 21 further performs a control of increasing the moving speed of the ball according to the number of back-and-forth movements of the ball in the in-play.

This is the end of the ball movement control process.

Figure 25:
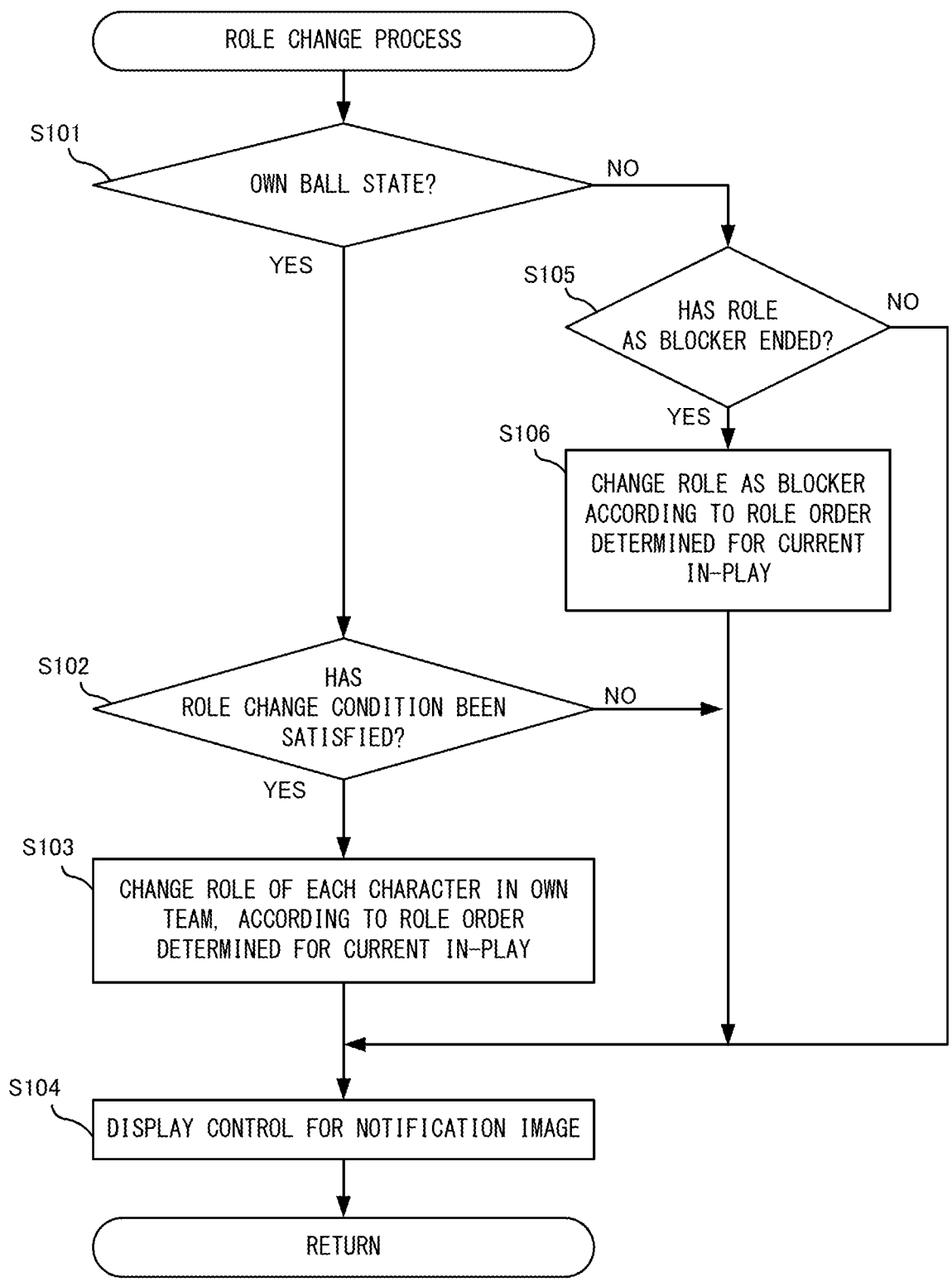
FIG. 25 is a flowchart showing a role change process in detail.

Referring back to FIG. 18, in step S21, the processor 21 performs a role change process. FIG. 25 is a flowchart showing the role change process in detail. First, in step S101, the processor 21, based on the own-side ball flag 317, determines whether or not the game is currently in the own-side ball period. As a result of the determination, when the game is currently in the own-side ball period (YES in step S101), the processor 21, in step S102, determines whether or not a condition for changing a role (hereinafter referred to as "role change condition") has been satisfied. Specifically, when a bump, a toss, or a spike has occurred on the own team side, it is determined that the role change condition has been satisfied. In other words, it is determined that the athlete character has finished the role assigned thereto at that time.

As the result of the determination, when the role change condition has not been satisfied (NO in step S102), the process proceeds to step S104 described later. When the role change condition has been satisfied (YES in step S102), the processor 21, in step S103, changes the role of the athlete character, of the own team, having satisfied the role change condition, based on the order pattern indicated by the current order pattern data 308. Then, the processor 21 stores the role after the change, as the assigned role data.

Meanwhile, when the result of the determination in step S101 is that the game is currently in the opponent-side ball period (NO in step S101), the processor 21, in step S105, determines whether or not an athlete character being the blocker has finished the role as the blocker. Specifically, when a contact with the ball due to a block (bounce back or one touch) has occurred or when a block has failed (a contact with the ball has not occurred), it is determined that the athlete character has finished the role as the blocker.

As a result of the determination, when the athlete character has finished the role of the blocker (YES in step S105), the processor 21, in step S106, changes the role of the athlete character as a blocker, based on the order pattern indicated by the current order pattern data 308. Then, the processor 21 stores the role after the change, as the assigned role data. Thereafter, the process proceeds to step S104 described later. When the athlete character has not finished the role as the blocker (NO in step S105), step S106 is skipped (i.e., role change is not performed), and the process proceeds to step S104 described later.

Next, in step S104, the processor 21 performs a control of displaying a notification image for notifying the next role, at an appropriate timing. That is, the processor 21 generates a notification image according to the role after the change. Furthermore, the processor 21 performs a display control such that the notification image is displayed in a predetermined position on the game screen for a predetermined period from a predetermined timing.

This is the end of the role change process.

Referring back to FIG. 18, in step S22, the processor 21 performs a role change process for the opponent team. That is, the processor 21 performs the same process as the process in step S21 also for the opponent team.

Next, in step S23, the processor 21 determines whether or not the ball has landed in the court. When the ball has not landed (NO in step S23), the processor 21, in step S24, captures the virtual space in which the above process is reflected, with the virtual camera, to generate a game image, and outputs the game image to the display section 5. Thereafter, the processor 21 returns to step S13 and repeats the process.

When the ball has landed in the court (YES in step S23), the in-play is interrupted. In this case, the processor 21 performs a scoring process in step S25. Specifically, the processor 21 performs a process of giving a point to the own team or the opponent team, based on the position where the ball has landed (update of the game state management data 313). This is the end of the in-play process.

Referring back to FIG. 16, in step S3, the processor 21 determines whether or not a match ending condition has been satisfied, based on the game state management data 313. For example, when either team has earned 5 points, it is determined that the match ending condition has been satisfied. As a result of the determination, when the match ending condition has not been satisfied (NO in step S3), the processor 21 returns to step S2 and repeats the process. When the match ending condition has been satisfied (YES in step S3), the processor 21 performs a match ending process in step S4. For example, the processor 21 performs a process of displaying a predetermined representation that indicates the result of the match, the winning team, etc.

This is the end of the detailed description for the game processing according to the exemplary embodiment.

As described above, in the exemplary embodiment, during a period of one in-play, a control of successively assigning the roles to the athlete characters in a predetermined order, is performed. Thus, the roles that the user (athlete character) takes during the in-play can be diversified, thereby improving the entertainment characteristics of the ball game.

[Modifications]

In the above exemplary embodiment, manual movement of an athlete character is allowed in a part (manual-movement-allowed period) of the opponent-side ball period. After the auto-movement control process has ended, whether or not the game is currently in the manual-movement-allowed period is determined. In another embodiment, the auto-movement control process and the manual movement control process may be performed in parallel. For example, even when auto-movement control is being performed, if an input operation to the analog stick 42 is detected, the manual movement control process based on the input operation may be preferentially performed (with the auto-movement control being interrupted).

As for the movement target point of the blocker or the receiver, the following control may be performed. For example, the movement target point of the blocker may be determined according to the position of the opponent's spiker, and auto movement of the blocker toward the determined point may be performed. Like the blocker, the movement target point of the own team's receiver may be determined according to the position of the opponent's spiker, and auto-movement of the receiver toward the determined point may be performed. Alternatively, the movement target point of the receiver may be determined according to the position of the own team's blocker. Still alternatively, the movement target point of the receiver may be determined according to both the position of the opponent's spiker and the position of the own team's blocker.

In the above exemplary embodiment, the moving speed of the ball is adjusted according to the game progress. As for a team having less points (losing team), the moving speed of each athlete character may be increased (according to a score difference). Since the moving speed of each athlete character in the losing team is increased, the athlete character can more easily bump the ball. That is, for the losing team, the ball can be made to less easily land in the court. Thus, the possibility of reduction in the entertainment characteristics of the game due to one-sided game can be reduced.

In the above exemplary embodiment, in the case where the opponent team has the right to serve, when an opponent's serve has occurred, the receiver is determined according to the direction of the serve, and the role order of the own team is determined accordingly. In another embodiment, even when the opponent team has the right to serve, the role order of the own team may be determined before the opponent's serve is performed. For example, when the order pattern A was used in the last in-play, the order pattern B may be unconditionally used in the current in-play.

In the above exemplary embodiment, the number of the users participating in the game is 4. However, the present disclosure is not limited thereto. Some of the athlete characters may be AI-controlled by the processor 21. For example, only one user may participate in the game, and the ally character and the opponent characters may be AI-controlled by the processor 21.

In the above exemplary embodiment, the volleyball game has been described as an example. However, the processing of the exemplary embodiment is also applicable to any ball game as long as it is a team vs team ball game and a ball rally is continued between the teams. Moreover, the processing of the above exemplary embodiment is also applicable to a ball game having a plurality of roles. For example, in a ball game the concept of which is football, roles of FW, MF, and DF (GK in some cases) may be changed between a plurality of users in a predetermined order at a predetermined timing while the game is being progressed.

In the above exemplary embodiment, a case where a series of game processing is performed in a single game apparatus 2 has been described. However, in another embodiment, the series of processes above may be performed in an information processing system that includes a plurality of information processing apparatuses. For example, in an information processing system that includes a terminal side apparatus and a server side apparatus capable of communicating with the terminal side apparatus via a network, a part of the series of processes above may be performed by the server side apparatus. Alternatively, in an information processing system that includes a terminal side apparatus and a server side apparatus capable of communicating with the terminal side apparatus via a network, a main process of the series of processes above may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various types of game processing and stream the execution results as video/audio to the game apparatus 2.

While the exemplary embodiment has been described in detail, the foregoing description is in all aspects illustrative and not restrictive. It is to be understood that numerous other modifications and variations can be devised without departing from the scope of the exemplary embodiments.

What is claimed is:

1. An information processing system, comprising:
   an operation device including at least an inertial sensor and a data transmission device configured to transmit operation data based on an output of the inertial sensor; and
   an information processing apparatus including a processor, wherein
   the information processing apparatus is configured to:
      perform a game regarding a sport by using a moving object in a virtual space and character objects that include a user character to be operated by a user, an ally character, and an opponent character;
      arrange the user character and the ally character in a first area of the virtual space, and arrange the opponent character in a second area of the virtual space;
      assign, to the user character, one of a plurality of roles in a predetermined order, according to a progress of the game, the plurality of roles including at least a role that moves the moving object in the first area and a role that moves the moving object toward the second area;
      automatically move the user character to which a predetermined role is assigned, in the first area, on the basis of the predetermined role and a moving direction of the moving object; and
      in a case where the predetermined role is assigned to the user character and the operation data satisfies a condition corresponding to the predetermined role, move the moving object by an action of the user character based on the predetermined role and the operation data.

2. The information processing system according to claim 1, wherein
   the operation device further includes a direction input section,
   the operation data further includes an output of the direction input section, and
   when the predetermined role is assigned to the user character, the processor moves the user character on the basis of the output of the direction input section and the predetermined role.

3. The information processing system according to claim 2, wherein
   movement based on the output of the direction input section is possible when the moving object is in the second area.

4. The information processing system according to claim 1, wherein
   the one role among the plurality of roles is assigned to the user character, regardless of a positional relationship between the moving object and the user character.

5. The information processing system according to claim 1, wherein
   the predetermined order with respect to the user character is determined when the opponent character, to which a role of moving the moving object toward the first area is assigned, has performed a predetermined action based on the role.

6. The information processing system according to claim 1, wherein
the user character is automatically moved on the basis of at least a position of the opponent character.

7. The information processing system according to claim 1, wherein
the user character is automatically moved on the basis of at least a position of the ally character.

8. The information processing system according to claim 1, wherein
in a case where a first role is assigned to the user character, when a positional relationship between the moving object that moves toward the first area and the user character satisfies a predetermined condition, the moving direction of the moving object is changed to a direction toward the second area.

9. The information processing system according to claim 1, wherein
in a case where a second role is assigned to the user character, when the operation data indicates that the operation device has been swung with a predetermined orientation at a second timing earlier than a first timing, the moving object is moved toward the second area on the basis of the operation data.

10. The information processing system according to claim 1, further comprising:
a second information processing apparatus, wherein
the opponent character or the ally character is set to be controlled by a user of the second information processing apparatus, and
the information processing apparatus is configured to assign, to the opponent character or the ally character, one of a plurality of roles in a predetermined order, according to a progress of the game, the plurality of roles including at least a role that moves the moving object in the first area and a role that moves the moving object toward the second area.

11. The information processing system according to claim 1, wherein
a notification image indicating, for the user, the role assigned to the user character is displayed.

12. The information processing system according to claim 11, wherein
when the role assigned to the user character has been changed, the notification image is displayed.

13. The information processing system according to claim 11, wherein
after the predetermined role has been assigned to the user character, the notification image is displayed at a timing before a timing to perform an operation corresponding to the assigned role.

14. The information processing system according to claim 1, wherein
a moving speed of a character object belonging to a team that is losing in game progress is increased, between an own team to which the user character and the ally character belong and an opponent team to which the opponent character belongs.

15. The information processing system according to claim 1, wherein
a moving speed of the moving object is increased, according to an increase in the number of movements of the moving object between the first area and the second area.

16. The information processing system according to claim 15, wherein
a moving speed of the moving object at a start of an in-play period, which is started when a predetermined starting condition is satisfied and is ended when a predetermined ending condition is satisfied, is determined on the basis of a moving speed of the moving object at an end of a last in-play period.

17. A non-transitory computer-readable storage medium having stored therein an information processing program to be executed by a computer of an information processing system that includes an operation device having at least an inertial sensor, and a data transmission device configured to transmit operation data based on an output of the inertial sensor, the information processing program, when executed, causes the computer to provide execution comprising:
performing a game regarding a sport by using a moving object in a virtual space and character objects that include a user character to be operated by a user, an ally character, and an opponent character;
arranging the user character and the ally character in a first area of the virtual space, and arranging the opponent character in a second area of the virtual space;
assigning, to the user character, one of a plurality of roles in a predetermined order, according to a progress of the game, the plurality of roles including at least a role that moves the moving object in the first area and a role that moves the moving object toward the second area;
automatically move-moving the user character to which a predetermined role is assigned, in the first area, on the basis of the predetermined role and a moving direction of the moving object; and
in a case where the predetermined role is assigned to the user character and the operation data satisfies a condition corresponding to the predetermined role, moving the moving object by an action of the user character based on the predetermined role and the operation data.

18. An information processing apparatus, comprising:
an operation device including at least an inertial sensor, and a data transmission device configured to transmit operation data based on an output of the inertial sensor; and
processing circuitry including at least one processor, wherein
the processing circuitry is configured to:
perform a game regarding a sport by using a moving object in a virtual space and character objects that include a user character to be operated by a user, an ally character, and an opponent character;
arrange the user character and the ally character in a first area of the virtual space, and arrange the opponent character in a second area of the virtual space;
assign, to the user character, one of a plurality of roles in a predetermined order, according to a progress of the game, the plurality of roles including at least a role that moves the moving object in the first area and a role that moves the moving object toward the second area;
automatically move the user character to which a predetermined role is assigned, in the first area, on the basis of the predetermined role and a moving direction of the moving object; and
in a case where the predetermined role is assigned to the user character and the operation data satisfies a condition corresponding to the predetermined role, move the moving object by an action of the user character based on the predetermined role and the operation data.

19. An information processing method to be performed by a processor of an information processing apparatus including an operation device having at least an inertial sensor, and a data transmission device configured to transmit operation data based on an output of the inertial sensor, the method comprising:

performing a game regarding a sport by using a moving object in a virtual space and character objects that include a user character to be operated by a user, an ally character, and an opponent character;

arranging the user character and the ally character in a first area of the virtual space, and arranging the opponent character in a second area of the virtual space;

assigning, to the user character, one of a plurality of roles in a predetermined order, according to a progress of the game, the plurality of roles including at least a role that moves the moving object in the first area and a role that moves the moving object toward the second area;

automatically moving the user character to which a predetermined role is assigned, in the first area, on the basis of the predetermined role and a moving direction of the moving object; and in a case where the predetermined role is assigned to the user character and the operation data satisfies a condition corresponding to the predetermined role, moving the moving object by an action of the user character based on the predetermined role and the operation data.

20. The information processing system according to claim 1, wherein the predetermined role is changed to another role, from the plurality of roles, in the predetermined order.

* * * * *